(12) United States Patent
Shimizu et al.

(10) Patent No.: US 11,448,289 B2
(45) Date of Patent: *Sep. 20, 2022

(54) DEVELOPING DEVICE

(71) Applicant: BROTHER KOGYO KABUSHIKI KAISHA, Nagoya (JP)

(72) Inventors: Takashi Shimizu, Nagoya (JP); Yasuo Fukamachi, Nagoya (JP); Keita Shimizu, Nagoya (JP); Kazutoshi Nakamura, Kuwana (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/337,729

(22) Filed: Jun. 3, 2021

(65) Prior Publication Data

US 2021/0293309 A1 Sep. 23, 2021

Related U.S. Application Data

(63) Continuation of application No. 16/823,679, filed on Mar. 19, 2020, now Pat. No. 11,028,903.

(30) Foreign Application Priority Data

Mar. 27, 2019 (JP) .............................. JP2019-059882
Mar. 27, 2019 (JP) .............................. JP2019-059883

(51) Int. Cl.
*F16H 3/18* (2006.01)
*G03G 15/08* (2006.01)

(52) U.S. Cl.
CPC ........... *F16H 3/18* (2013.01); *G03G 15/0808* (2013.01)

(58) Field of Classification Search
None
See application file for complete search history.

(56) References Cited

U.S. PATENT DOCUMENTS 5,398,098 A * 3/1995 Fukunaga ............ G03G 21/105
399/358
6,512,903 B2 1/2003 Chadani
(Continued)

FOREIGN PATENT DOCUMENTS

EP 2 026 140 A2 2/2009
JP 2006-139313 A 6/2006
(Continued)

OTHER PUBLICATIONS

International Search Report and Written Opinion issued in PCT/JP2019/038503, dated Dec. 10, 2019.
(Continued)

*Primary Examiner* — Victor Verbitsky
(74) *Attorney, Agent, or Firm* — Merchant & Gould P.C.

(57) ABSTRACT

A developing device may include an auger or an agitator that is capable of supplying toner in a toner accommodation chamber to a developing chamber and is rotatable about an auger axis extending in an axial direction, a transporting gear that is rotatable together with the auger or the agitator, and a moving gear that is in mesh with a coupling gear and is rotatable both counterclockwise and clockwise. The moving gear is movable while being in mesh with the coupling gear between a first position where the moving gear is in mesh with the transporting gear and a second position where the moving gear is out of mesh with the transporting gear. The moving gear moves to the first position when the coupling gear rotates counterclockwise and to the second position when the coupling gear rotates clockwise.

25 Claims, 19 Drawing Sheets

(56) References Cited

U.S. PATENT DOCUMENTS

| | | | |
|---|---|---|---|
| 2002/0012546 A1 | 1/2002 | Chanadi | |
| 2003/0235432 A1 | 12/2003 | Ahn et al. | |
| 2005/0031359 A1* | 2/2005 | Ishii | G03G 15/0889 399/12 |
| 2011/0123231 A1 | 5/2011 | Ozawa et al. | |
| 2015/0037071 A1 | 2/2015 | Yamamoto | |
| 2017/0285560 A1 | 10/2017 | Shimizu et al. | |
| 2018/0143564 A1 | 5/2018 | Asanuma et al. | |
| 2020/0019085 A1 | 1/2020 | Shimizu | |

FOREIGN PATENT DOCUMENTS

| | | |
|---|---|---|
| JP | 2016-50991 A | 4/2016 |
| JP | 2016-173423 A | 4/2016 |
| JP | 2016-173423 A | 9/2016 |
| JP | 2017-181946 A | 5/2017 |
| JP | 2018-189680 A | 11/2018 |
| WO | 2018/198605 A1 | 11/2018 |

OTHER PUBLICATIONS

JP 2006139313 A T Machine Translation, Chabatani, Japan, 2006 (in parent application).
International Search Report and Written Opinion issued in corresponding International Patent Application No. PCT/JP2019/038503, dated Dec. 10, 2019.
Extended European Search Report issued in corresponding European Patent Application No. 19858661.2, dated Jul. 13, 2021.

* cited by examiner

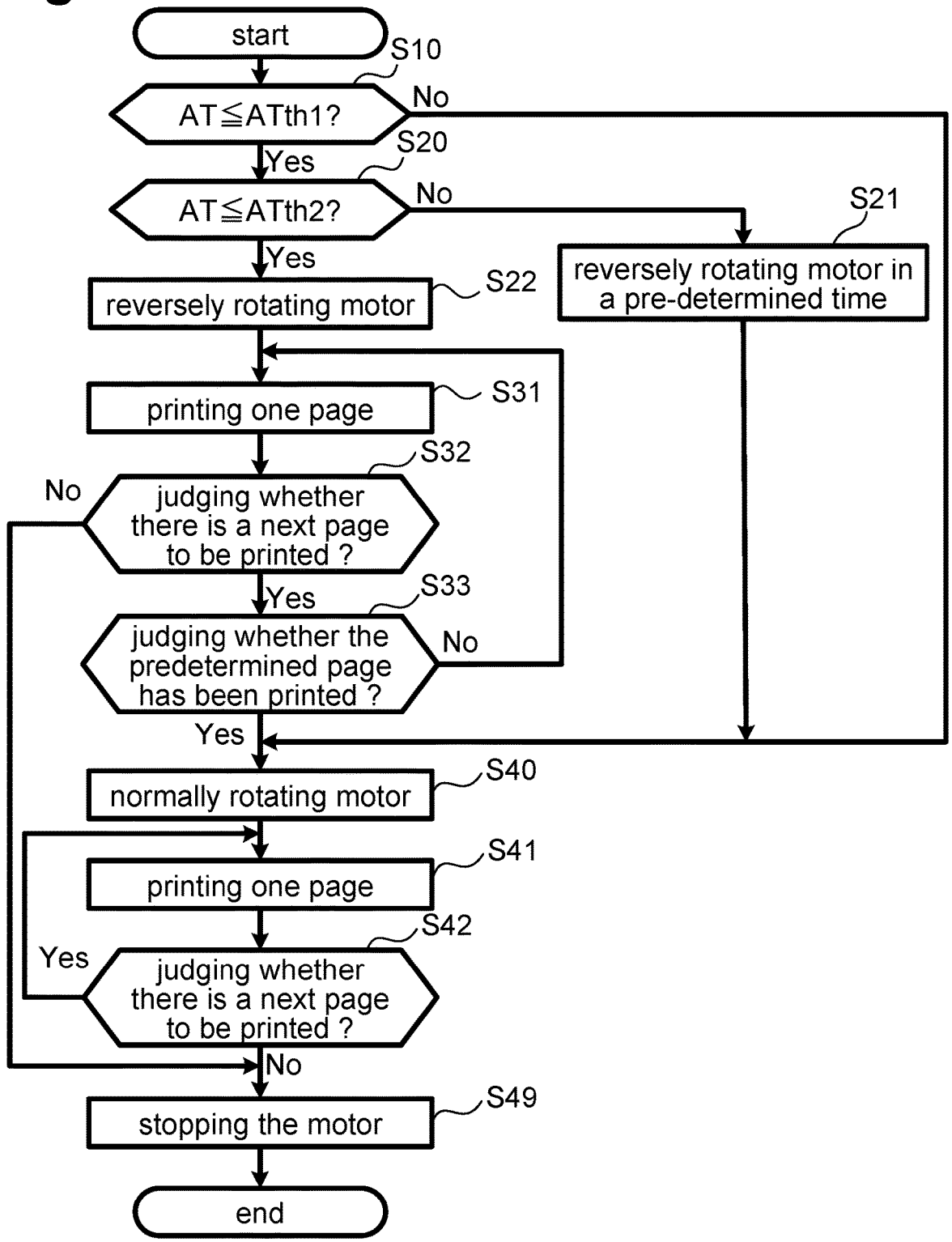

DEVELOPING DEVICE

CROSS-REFERENCE TO RELATED APPLICATIONS

This application is a continuation of U.S. patent application Ser. No. 16/823,679, filed Mar. 19, 2020, now U.S. Pat. No. 11,028,903, which claims priority from Japanese Patent Applications No. 2019-059882 filed Mar. 27, 2019 and No. 2019-059883 filed Mar. 27, 2019. The entire content of the priority applications is incorporated herein by reference.

TECHNICAL FIELD

The present disclosure relates to a developing device including a coupling to which a driving force is inputted.

BACKGROUND

Hitherto, an image forming apparatus that transports a sheet by reversely rotating a main motor of a body in a driving operation for back-side printing has been known. In this image forming apparatus, when the motor is rotated reversely, a photosensitive drum rotates reversely, whereas a developing roller is kept stopped while being pressed against the photosensitive drum. A developing cartridge includes a coupling that receives a driving force from a body of an image forming apparatus. Furthermore, an image forming apparatus is known in which toner is supplied appropriately from a developer cartridge to a casing of a developing cartridge in accordance with the amount of toner remaining in the casing of the developing cartridge. This image forming apparatus is configured as follows. A lever provided on the body is moved by activating a solenoid of the apparatus body, and the lever provided on the body accesses a lever provided on the developing cartridge, whereby toner is supplied.

SUMMARY

The present application may note that, in the known image forming apparatus, however, the developing roller cannot be rotated in the same direction in both cases where the coupling is rotated clockwise and counterclockwise. The present application may also note separately that, in the known apparatus, toner cannot be supplied to a developing chamber of the developing cartridge only by the operation of the coupling and that there is a demand for a developing device in which toner can be supplied with required timing only by the operation of a coupling.

Accordingly, one aspect of disclosure provides a developing device in which a developing roller rotates in the same direction in either case where a coupling is rotated clockwise or counterclockwise. Another aspect of disclosure provides a developing device in which toner can be supplied to a developing chamber only by the operation of a coupling

BRIEF DESCRIPTION OF THE DRAWINGS

FIG. 13 is a flow chart illustrating an example of a process executed by a controller.

DETAILED DESCRIPTION

Embodiments of the present disclosure will now be described in detail with reference to the drawings.

Figure 1:
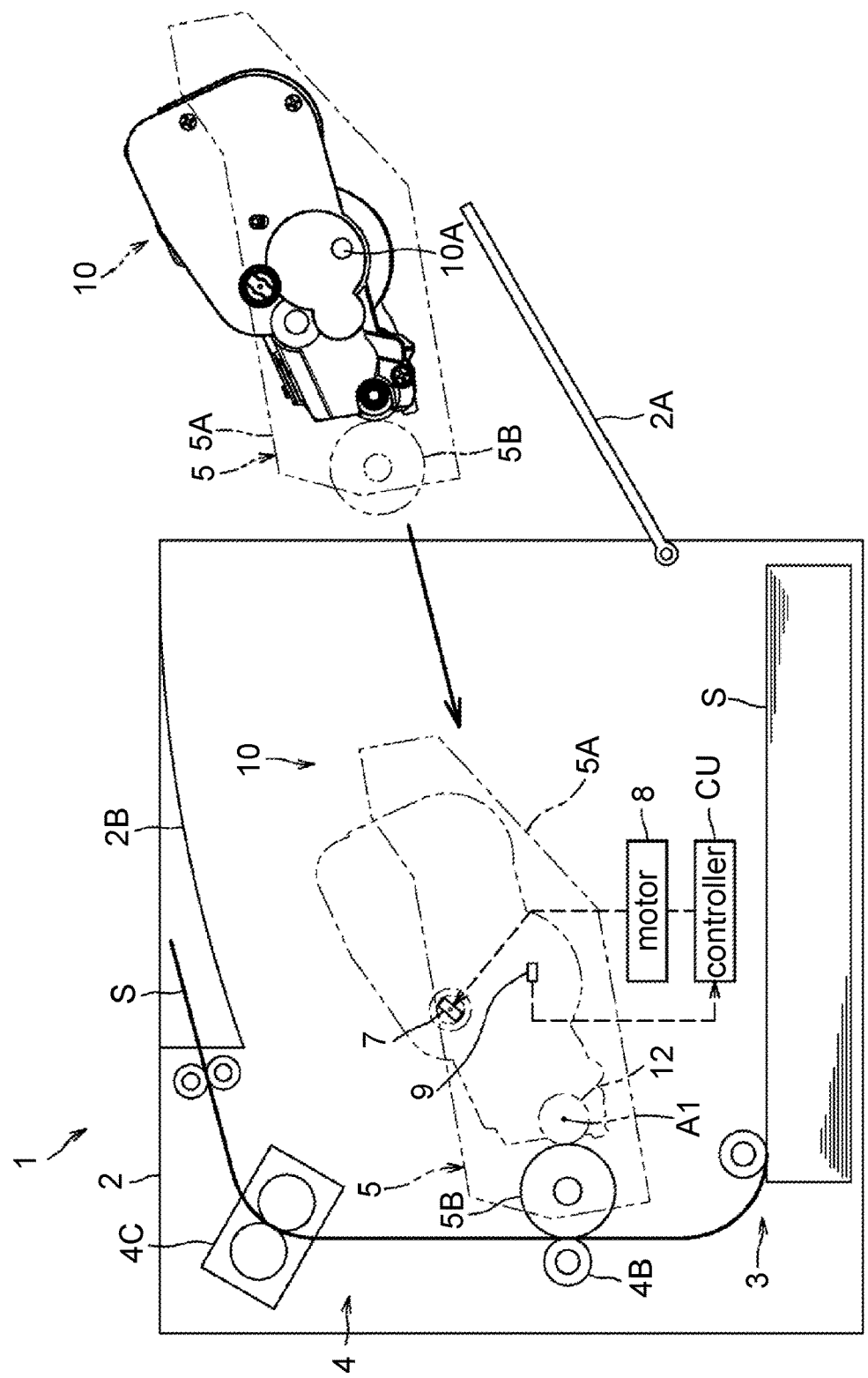
FIG. 1 is a cross-sectional view of an image forming apparatus.

As illustrated in FIG. 1, an image forming apparatus 1 mainly includes a body casing 2, a sheet feeding unit 3, an image forming unit 4, and a controller CU. The body casing 2 includes a front cover 2A and a sheet output tray 2B positioned at the top of the body casing 2. The body casing 2 is provided thereinside with the sheet feeding unit 3 and the image forming unit 4. When the front cover 2A is open, a developing cartridge 10, as an example of the developing device 10, may be detachably attached.

The sheet feeding unit 3 accommodates sheets S. Furthermore, the sheet feeding unit 3 supplies the sheets S one by one to the image forming unit 4.

The image forming unit 4 includes a drum cartridge 5, the developing cartridge 10, an exposure device not illustrated, a transfer roller 4B, and a fixing device 4C.

The drum cartridge 5 includes a frame 5A and a photosensitive drum 5B rotatably supported by the frame 5A.

The developing cartridge 10 is attachable to and detachable from the drum cartridge 5. The developing cartridge 10 attached to the drum cartridge 5 may be attached to and detached from the image forming apparatus 1.

Figure 2:
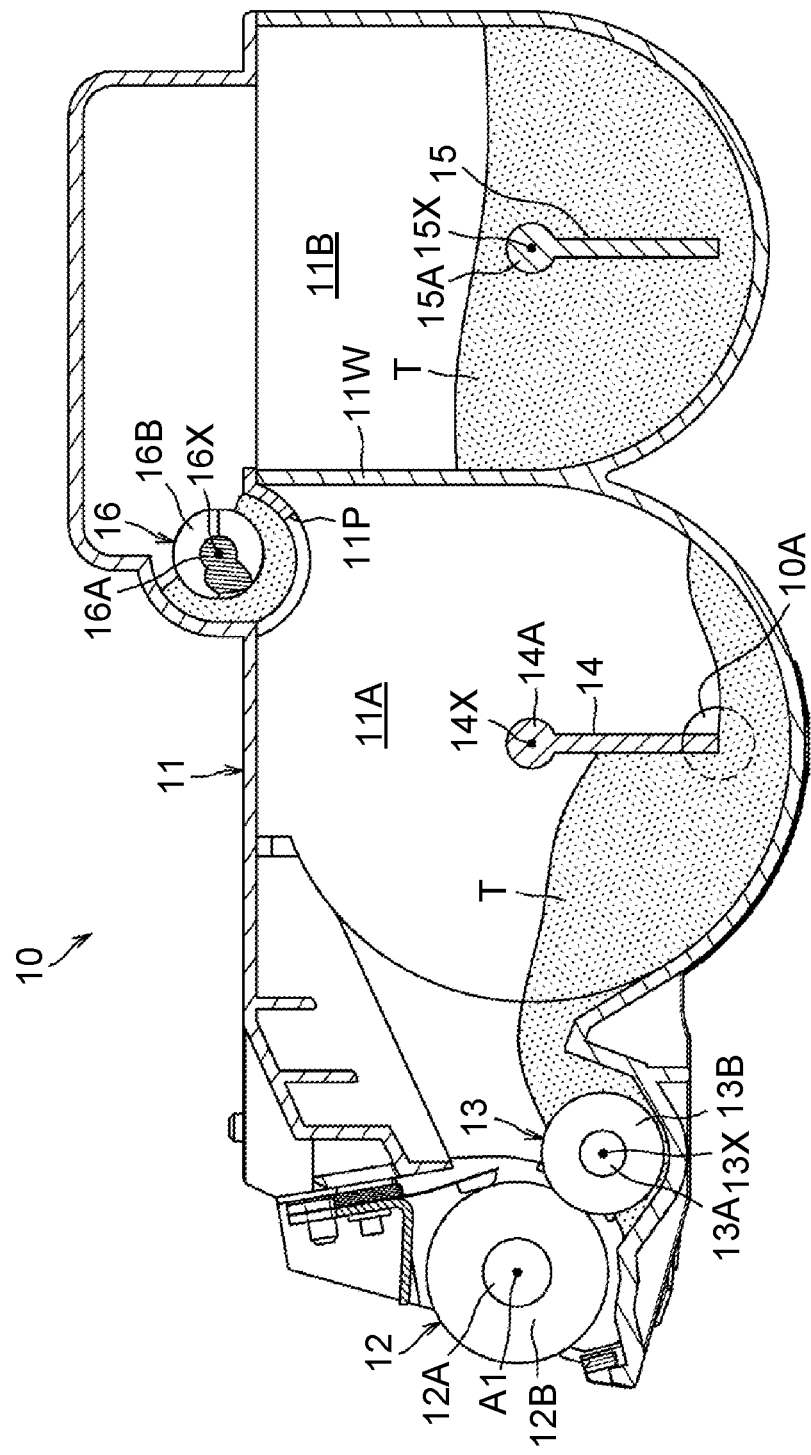
FIG. 2 is a cross-sectional view of a developing device.

As illustrated in FIG. 2, the developing cartridge 10 includes a casing 11, a developing roller 12, a supply roller 13, a first agitator 14, a second agitator 15, and an auger 16.

The casing 11 has a developing chamber 11A and a toner accommodation chamber 11B that are positioned inside the casing 11. The developing chamber 11A is positioned inside the casing 11. The toner accommodation chamber 11B is positioned inside the casing 11. The developing chamber 11A and the toner accommodation chamber 11B are separated from each other by a partition 11W but are connected to each other through a path 11P in a part where the auger 16 is provided. The path 11P is provided only in part of the casing 11 in an axial direction.

The developing chamber 11A is provided with the developing roller 12 and the supply roller 13. The developing chamber 11A is capable of accommodating toner T to be supplied to the developing roller 12.

The developing cartridge 10 has detection windows 10A for optically detecting the amount of toner in the developing chamber 11A (see FIG. 1 as well).

The toner accommodation chamber 11B is a chamber capable of accommodating toner T different from that in the developing chamber 11A and to be supplied to the developing chamber 11A. The toner accommodation chamber 11B is positioned farther from the developing roller 12 than from the developing chamber 11A.

The developing roller 12 includes a developing roller shaft 12A extending in the axial direction, and a roller portion 12B. Note that the axial direction is the axial direction of the developing roller 12 and is hereinafter also simply referred to as the axial direction. The roller portion 12B covers the outer circumferential surface of the developing roller shaft 12A. The roller portion 12B is made of electrically conductive rubber or the like. The developing roller 12 is rotatable about a first axis A1 extending in the axial direction. The developing roller 12 is supported by the casing 11 in such a manner as to be rotatable about the developing roller shaft 12A. The developing roller 12 receives a developing bias applied thereto from the controller CU (see FIG. 1).

The supply roller 13 supplies the toner T to the developing roller 12. The supply roller 13 includes a supply roller shaft 13A extending in the axial direction, and a roller portion 13B. The roller portion 13B covers the outer circumferential surface of the supply roller shaft 13A. The roller portion 13B is made of sponge or the like. The supply roller 13 is rotatable about a supply roller axis 13X extending in the axial direction. The supply roller 13 is rotatable about the supply roller shaft 13A.

The first agitator 14 is a plate-like member that is elongated in the axial direction. The first agitator 14 includes a shaft 14A. The first agitator 14 is rotatable about a first agitator axis 14X extending in the axial direction. The shaft 14A is supported by the casing 11 in such a manner as to be rotatable about the first agitator axis 14X. The first agitator 14 is capable of agitating the toner T in the developing chamber 11A by rotating.

The second agitator 15 is a plate-like member that is elongated in the axial direction. The second agitator 15 includes a shaft 15A. The second agitator 15 is rotatable about a second agitator axis 15X extending in the axial direction. The shaft 15A is supported by the casing 11 in such a manner as to be rotatable about the second agitator axis 15X. The second agitator 15 is capable of agitating the toner T in the toner accommodation chamber 11B by rotating.

The auger 16 includes an auger shaft 16A extending in the axial direction, and a helical plate 16B. The helical plate 16B is fixed to the auger shaft 16A. The helical plate 16B rotates together with the auger shaft 16A. The auger 16 is rotatable about an auger axis 16X extending in the axial direction. The auger 16 supplies the toner T in the toner accommodation chamber 11B to the developing chamber 11A by rotating.

As illustrated in FIG. 1, the transfer roller 4B faces the photosensitive drum 5B. The transfer roller 4B transports the sheet S while nipping the sheet S in combination with the photosensitive drum 5B.

The photosensitive drum 5B is charged by a charging device not illustrated, and is exposed to light by the exposure device, whereby an electrostatic latent image is formed thereon. The developing cartridge 10 supplies the toner T to the electrostatic latent image, thereby forming a toner image on the photosensitive drum 5B. The sheet S fed from the sheet feeding unit 3 passes through the nip between the photosensitive drum 5B and the transfer roller 4B, whereby the toner image on the photosensitive drum 5B is transferred to the sheet S.

The fixing device 4C thermally fixes to the sheet S the toner image transferred to the sheet S. The sheet S to which the toner image has been thermally fixed is discharged to the sheet output tray 2B provided outside the body casing 2.

The controller CU is a device that controls the entire operation of the image forming apparatus 1. The controller CU controls a coupler 7, provided for driving the developing cartridge 10, to rotate by using a motor 8. The motor 8 is rotatable in normal and reverse directions. The controller CU is capable of rotating the coupler 7 both clockwise and counterclockwise by controlling the motor 8. Specifically, in accordance with a transmitting step in which a command for controlling the motor 8 is transmitted to the motor 8, the controller CU can drive the motor 8 to establish a first state in which a coupling 22 is rotated clockwise or in a second state in which the coupling 22 is rotated counterclockwise. In alternative embodiments, in the first state, the coupling 22 is rotated counterclockwise and, in the second state, the coupling 22 is rotated clockwise.

The image forming apparatus 1 further includes a sensor 9 that detects a remaining toner amount AT in the developing chamber 11A. The sensor 9 transmits a detection signal to the controller CU. The sensor 9 is an optical sensor and is a sensor unit including a light emitting portion and a light receiving portion. The light emitting portion faces one of the detection windows 10A that is on one side in the axial direction, and emits light toward the inside of the developing chamber 11A. The light receiving portion faces an other of the detection windows 10A that is on an other side in the axial direction, and receives the light from the light emitting portion. The controller CU is capable of identifying the remaining toner amount AT from a signal generated from the light received by the light receiving portion.

Now, details of the developing cartridge 10 will be described.

Figure 3:
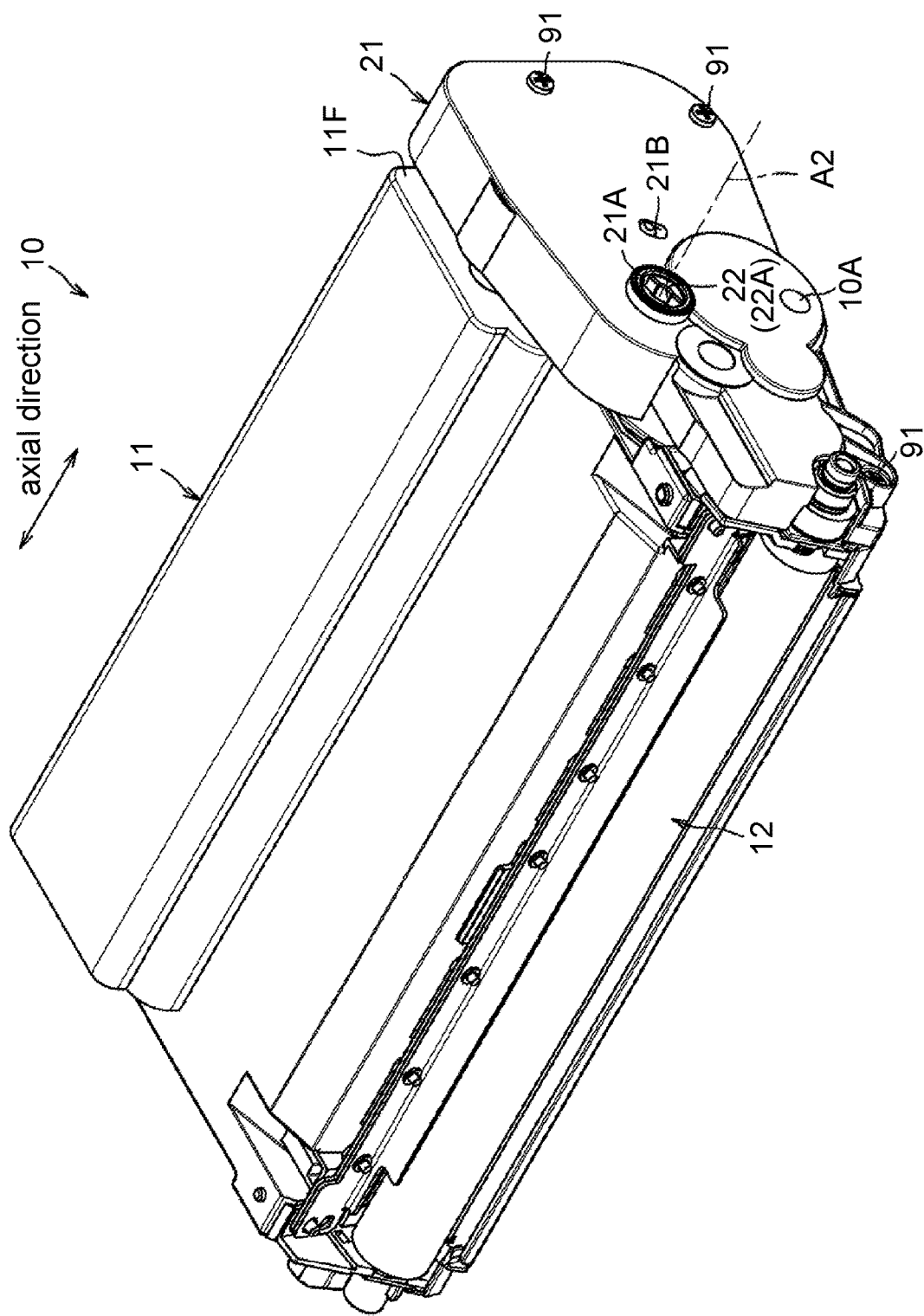
FIG. 3 is a perspective view illustrating one side of the developing device in the axial direction.

As illustrated in FIG. 3, the developing cartridge 10 includes a gear cover 21 and the coupling 22 on a side face 11F of the casing 11 that is on the one side in the axial direction.

The gear cover 21 has a coupling hole 21A and a journal hole 21B. The coupling hole 21A is a hole for exposing the coupling 22. The journal hole 21B extends in an arc shape centered at a second axis A2 extending in the axial direction. The journal hole 21B is an opening in which a translating or moving gear 33 to be described below (see FIG. 4) is journaled. The gear cover 21 is fixed to the casing 11 with a plurality of screws 91.

Figure 4:
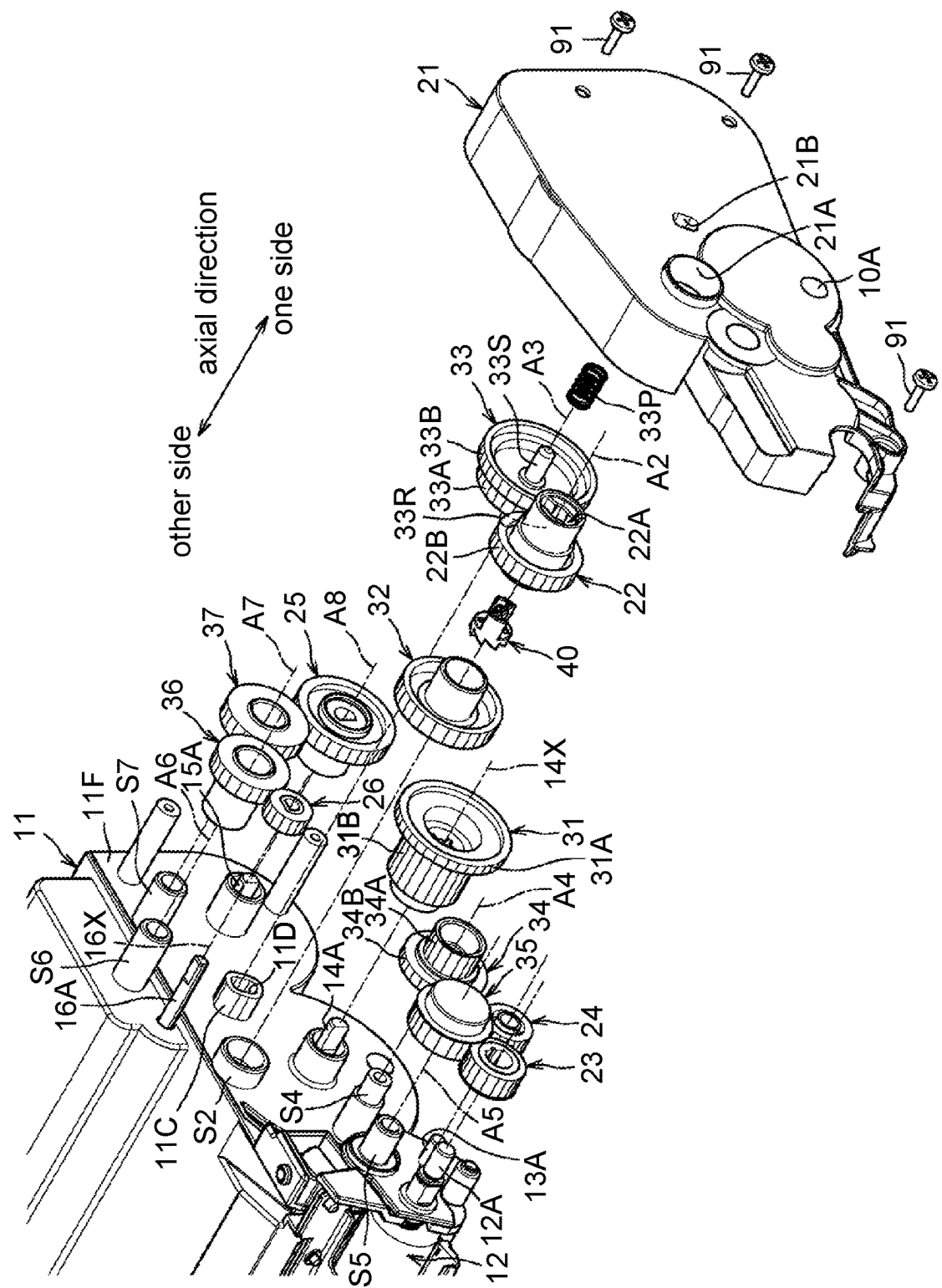
FIG. 4 is an exploded perspective view illustrating the one side of the developing device in the axial direction, with a gear cover removed.

The coupling 22 includes a recessed portion 22A for receiving a driving force and a coupling gear 22B (see FIG. 4). The recessed portion 22A is recessed in the axial direction. The recessed portion 22A is exposed through the coupling hole 21A of the gear cover 21. The coupler 7 (see FIG. 1) engages with the recessed portion 22A. The coupling 22 receives a driving force from the coupler 7, thereby being rotatable about the second axis A2 both clockwise and counterclockwise. That is, the coupling gear 22B is rotatable both clockwise and counterclockwise. Note that the term "gear" in this specification is not limited to a gear having gear teeth and transmitting a rotational force by using the gear teeth and includes a gear transmitting a rotational force by frictional transmission.

Figure 5:
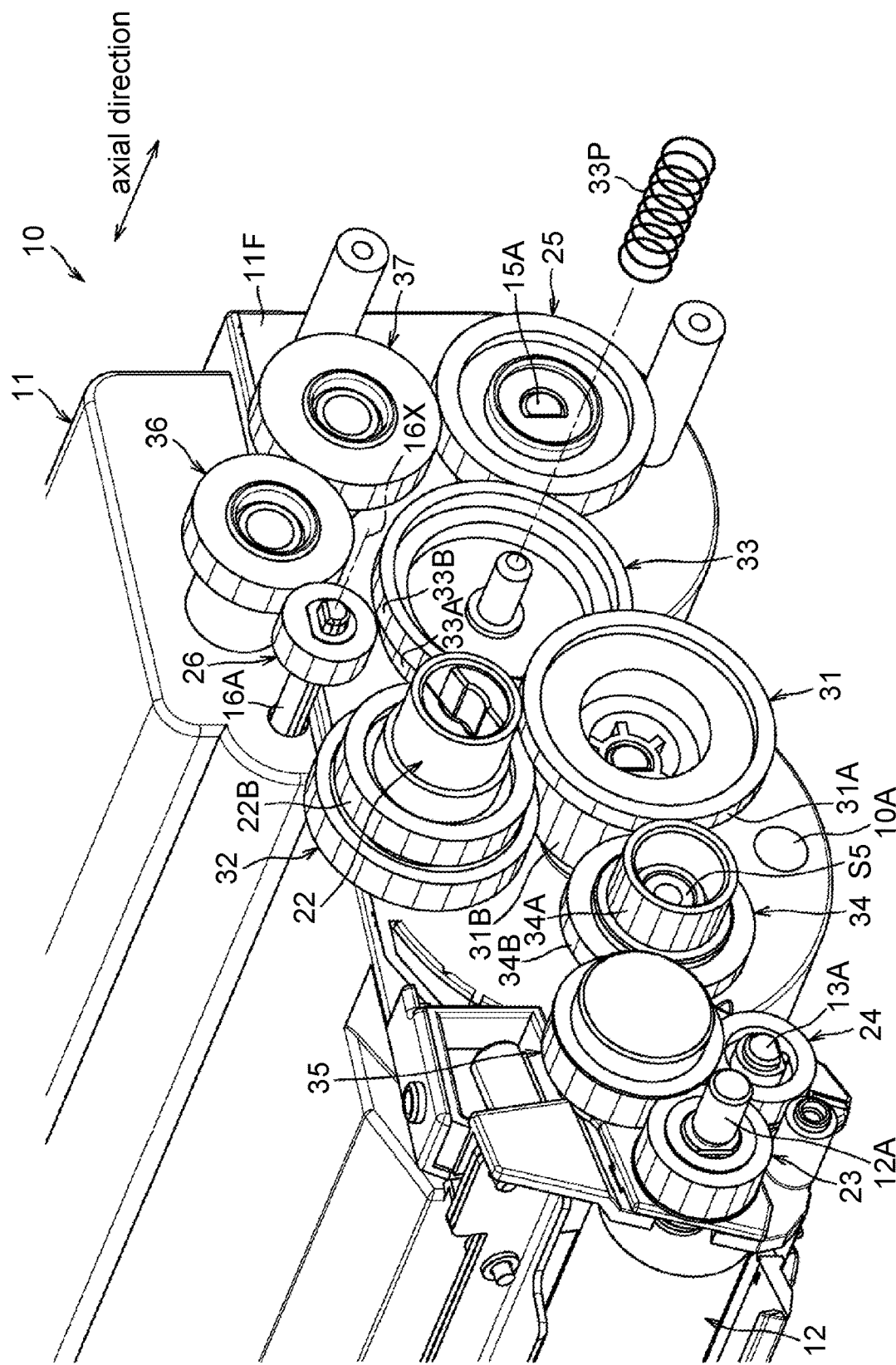
FIG. 5 is a perspective view illustrating the one side of the developing device in the axial direction, with the gear cover removed.

As illustrated in FIGS. 4 and 5, the developing cartridge 10 includes a developing roller gear 23, a supply roller gear 24, an agitator gear 25, a transporting gear 26, a first gear 31, a second gear 32, the translating or moving gear 33, a first idle gear 34, a second idle gear 35, a third idle gear 36, and a fourth idle gear 37. These gears are covered by the gear cover 21 (see FIG. 4).

Side walls of the casing 11 that are on the two respective sides in the axial direction and the gear cover 21 are provided with the detection windows 10A, respectively. The detection windows 10A are aligned with one another straight in the axial direction so that light can travel therethrough.

The casing 11 is provided on the side face 11F thereof with a shaft S2, a shaft S4, a shaft S5, a shaft S6, a shaft S7, and a bearing 11C.
The shaft S2 supports the second gear 32 rotatably.
The shaft S4 supports the first idle gear 34 rotatably.
The shaft S5 supports the second idle gear 35 rotatably.
The shaft S6 supports the third idle gear 36 rotatably.
The shaft S7 supports the fourth idle gear 37 rotatably.
The bearing 11C has a journal hole 11D extending along an arc centered at the second axis A2 extending in the axial direction. The bearing 11C supports the translating or moving gear 33 movably and rotatably.

The developing roller gear 23 is positioned at an end portion of the developing roller 12. More specifically, the developing roller gear 23 is attached to an end portion of the developing roller shaft 12A. The developing roller gear 23 is rotatable together with the developing roller shaft 12A.

The supply roller gear 24 is positioned at an end portion of the supply roller 13. More specifically, the supply roller gear 24 is attached to an end portion of the supply roller shaft 13A. The supply roller gear 24 is rotatable together with the supply roller shaft 13A.

The agitator gear 25 is attached to an end portion of the shaft 15A of the second agitator 15. The agitator gear 25 is rotatable together with the second agitator 15.

The transporting gear 26 is attached to an end portion of the auger shaft 16A. The transporting gear 26 is rotatable together with the auger 16.

The first gear 31 is a gear for rotating the developing roller 12. The first gear 31 is rotatable in a second direction which, in this embodiment is clockwise, about the first agitator axis 14X. The first gear 31 includes a large-diameter gear 31A and a small-diameter gear 31B having a smaller diameter than the large-diameter gear 31A. The large-diameter gear 31A rotates together with the small-diameter gear 31B.

The second gear 32 is rotatable in a first direction which, in this embodiment is counterclockwise, about the second axis A2 extending in the axial direction. The second gear 32 is in mesh with the first gear 31. More specifically, the second gear 32 is in mesh with the small-diameter gear 31B of the first gear 31.

The first idle gear 34 is rotatable about a fourth axis A4 extending in the axial direction. The first idle gear 34 is rotatably supported by the shaft S4.

The first idle gear 34 includes a small-diameter gear 34A and a large-diameter gear 34B having a larger diameter than the small-diameter gear 34A. The small-diameter gear 34A rotates together with the large-diameter gear 34B. The first idle gear 34 is in mesh with the first gear 31. More specifically, the small-diameter gear 34A of the first idle gear 34 is in mesh with the large-diameter gear 31A of the first gear 31.

The second idle gear 35 is rotatable about a fifth axis A5 extending in the axial direction. The second idle gear 35 is rotatably supported by the shaft S5.

The second idle gear 35 is in mesh with the first idle gear 34. More specifically, the second idle gear 35 is in mesh with the large-diameter gear 34B of the first idle gear 34.

Furthermore, the second idle gear 35 is in mesh with the developing roller gear 23. In addition, the second idle gear 35 is in mesh with the supply roller gear 24.

Therefore, when the first gear 31 rotates clockwise, the developing roller gear 23 and the developing roller 12 rotate counterclockwise with the aid of the first idle gear 34 and the second idle gear 35. Furthermore, when the first gear 31 rotates clockwise, the supply roller gear 24 and the supply roller 13 rotate counterclockwise with the aid of the first idle gear 34 and the second idle gear 35.

The translating or moving gear 33 includes a small-diameter gear 33A, a large-diameter gear 33B having a larger diameter than the small-diameter gear 33A, and shafts 33R and 33S. The large-diameter gear 33B rotates together with the small-diameter gear 33A. The moving gear 33 is rotatable both clockwise and counterclockwise about a third axis A3 extending in the axial direction.

The shaft 33R projects along the third axis A3 toward the other side in the axial direction. The shaft 33R is in engagement with the journal hole 11D of the bearing 11C and is supported by the bearing 11C in such a manner as to be rotatable and translatable/movable along the arc centered at the second axis A2.

The shaft 33S projects along the third axis A3 toward the one side in the axial direction. The shaft 33S is in engagement with the journal hole 21B of the gear cover 21 and is supported by the gear cover 21 in such a manner as to be rotatable and translatable/movable along the arc centered at the second axis A2.

The shaft 33S extends through a coil of a spring 33P, which is a compression coil spring. Accordingly, the spring 33P generates an urging force between the gear cover 21 and the moving gear 33. Hence, the moving gear 33 is constantly urged against the bearing 11C. A frictional force is generated between the moving gear 33 and the bearing 11C. This frictional force gives a resistance to the rotation of the moving gear 33 about the third axis A3.

The moving gear 33 is in mesh with the coupling gear 22B. More specifically, the small-diameter gear 33A of the moving gear 33 is constantly in mesh with the coupling gear 22B.

The moving gear 33 is under the resistance applied thereto by the spring 33P with respect to the rotation about the third axis A3. Therefore, when the coupling gear 22B rotates clockwise or counterclockwise, the moving gear 33 tends to move together with the coupling gear 22B under the resisting force. Hence, when the coupling gear 22B rotates counterclockwise, the moving gear 33 rotates together with the coupling gear 22B so as to translate/move counterclockwise about the second axis A2 and move to a first position (see FIG. 12) where the moving gear 33 is out of mesh with the first gear 31.

In contrast, when the coupling gear 22B rotates clockwise, the moving gear 33 rotates together with the coupling gear 22B so as to translate/move clockwise about the second axis A2 and move to a second position (see FIG. 11) where the moving gear 33 is in mesh with the first gear 31.

That is, the moving gear 33 is translatable/movable between the first position and the second position while being in mesh with the coupling gear 22B.

Figure 11A:
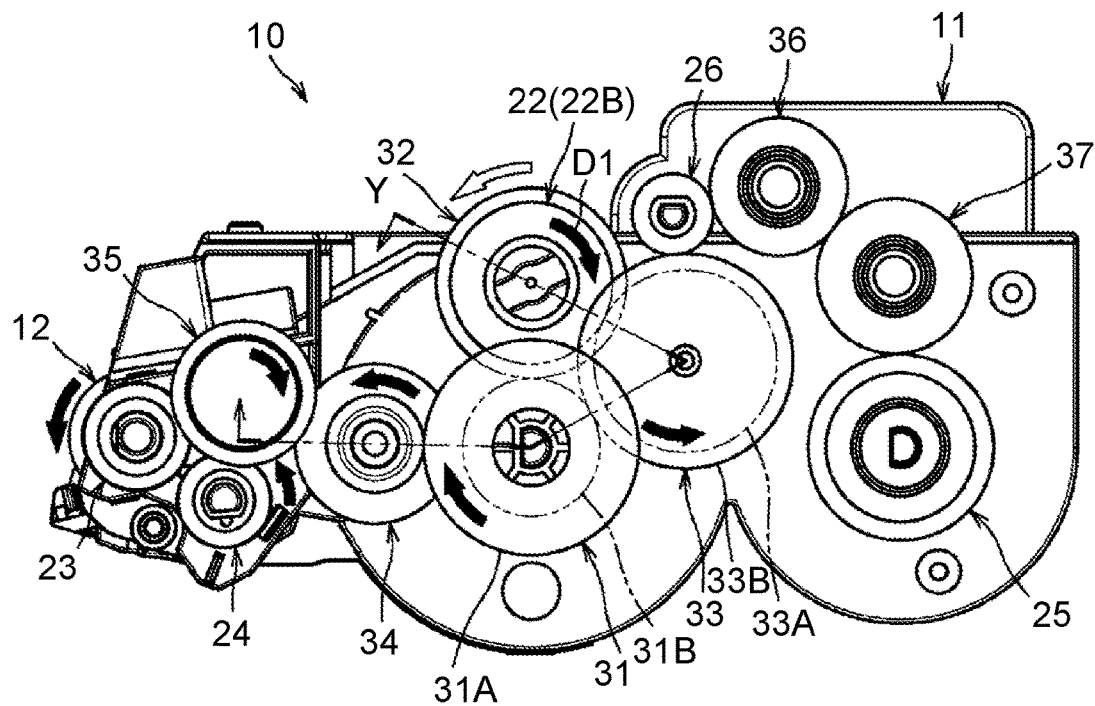
FIG. 11A includes a diagram illustrating the meshing of gears that is established when a moving gear is at a second position.
Figure 11B:
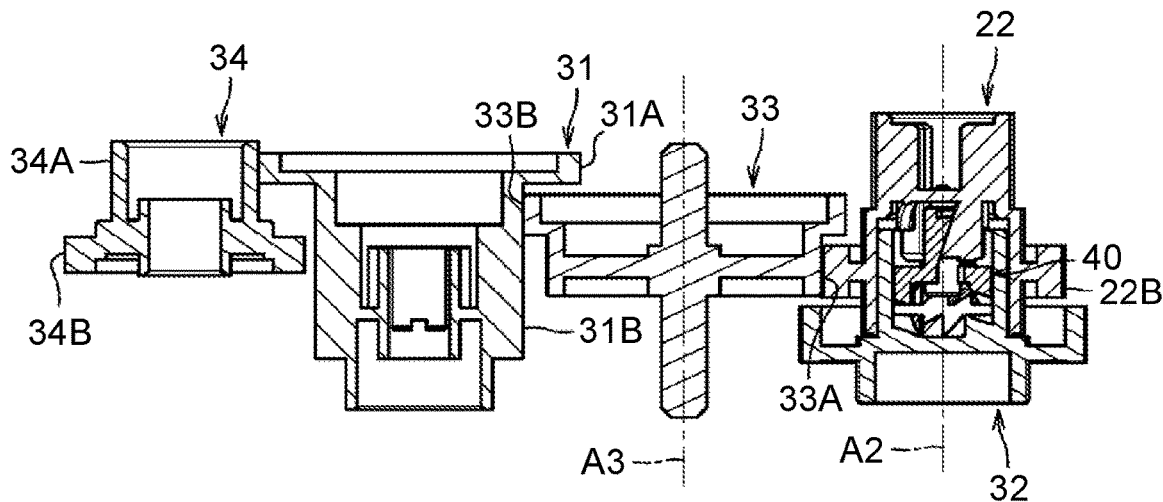
FIG. 11B is a diagram illustrating the meshing of the gears in a cross section taken along line Y-Y illustrated in FIG. 11A.

As illustrated in FIG. 11, when the moving gear 33 is at the second position, the large-diameter gear 33B is in mesh with the first gear 31. Meanwhile, when the moving gear 33 is at the second position, both the small-diameter gear 33A and the large-diameter gear 33B are out of mesh with the transporting gear 26.

Figure 12A:
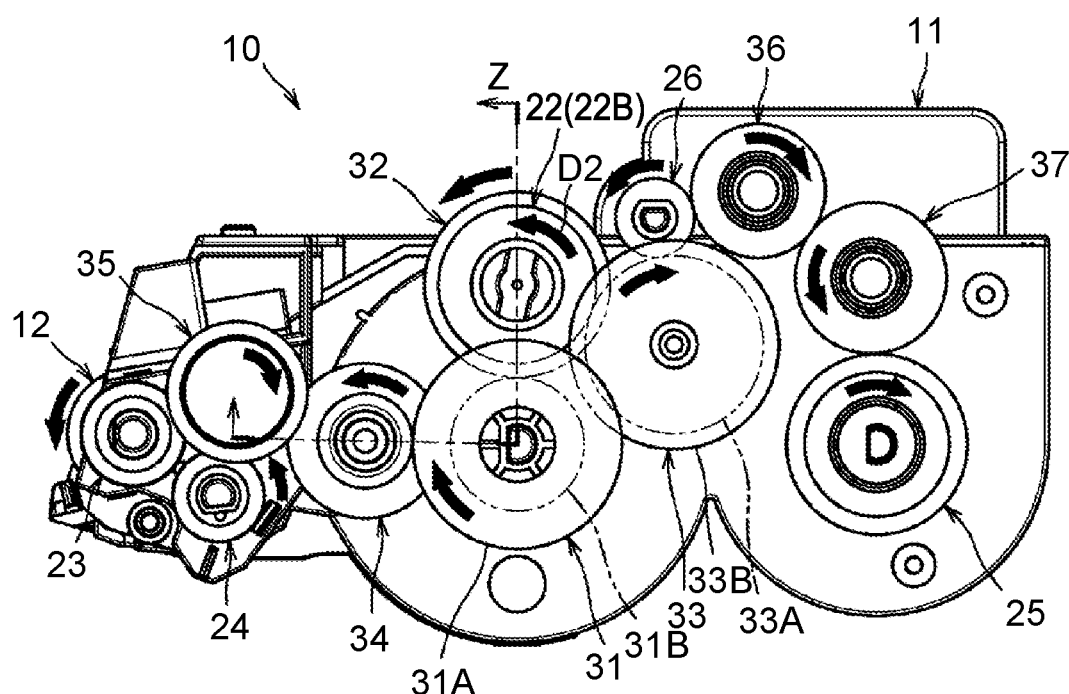
FIG. 12A includes a diagram illustrating the meshing of the gears that is established when the moving gear is at a first position.
Figure 12B:
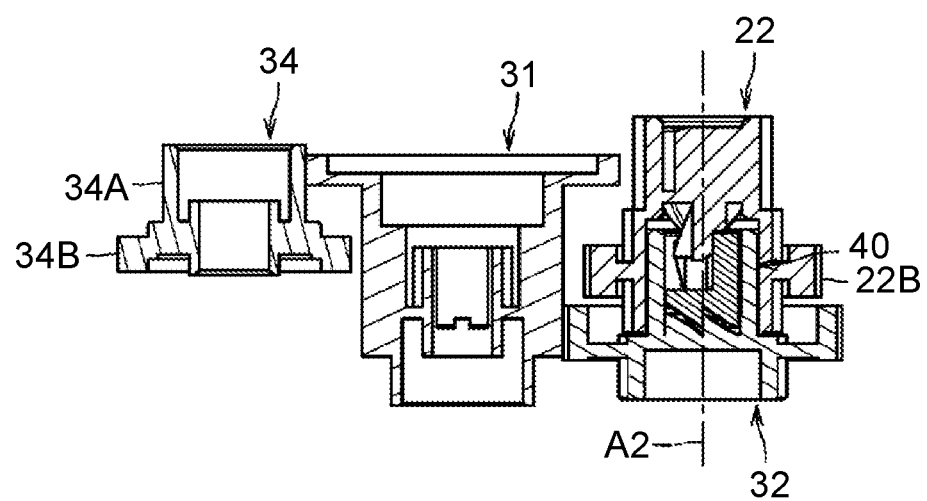
FIG. 12B is a diagram illustrating the meshing of the gears in a cross section taken along line Z-Z illustrated in FIG. 12A.

As illustrated in FIG. 12, when the moving gear 33 is at the first position, the small-diameter gear 33A is in mesh with the transporting gear 26. Meanwhile, when the moving gear 33 is at the first position, both the small-diameter gear 33A and the large-diameter gear 33B are out of mesh with the first gear 31.

Referring to FIGS. 4 and 5 again, the third idle gear 36 is rotatable about a sixth axis A6 extending in the axial direction. The third idle gear 36 is rotatably supported by the shaft S6. The third idle gear 36 is in mesh with the transporting gear 26.

The fourth idle gear 37 is rotatable about a seventh axis A7 extending in the axial direction. The fourth idle gear 37 is rotatably supported by the shaft S7. The fourth idle gear 37 is in mesh with the third idle gear 36 and the agitator gear 25.

Therefore, when the transporting gear 26 rotates, the auger 16 rotates. Furthermore, the agitator gear 25 and the second agitator 15 rotate with the aid of the third idle gear 36 and the fourth idle gear 37. That is, the second agitator 15 agitates the toner T in the toner accommodation chamber 11B and transports the toner T to the auger 16, and the auger 16 transports the toner T from the toner accommodation chamber 11B to the developing chamber 11A through the path 11P.

Figure 6A:
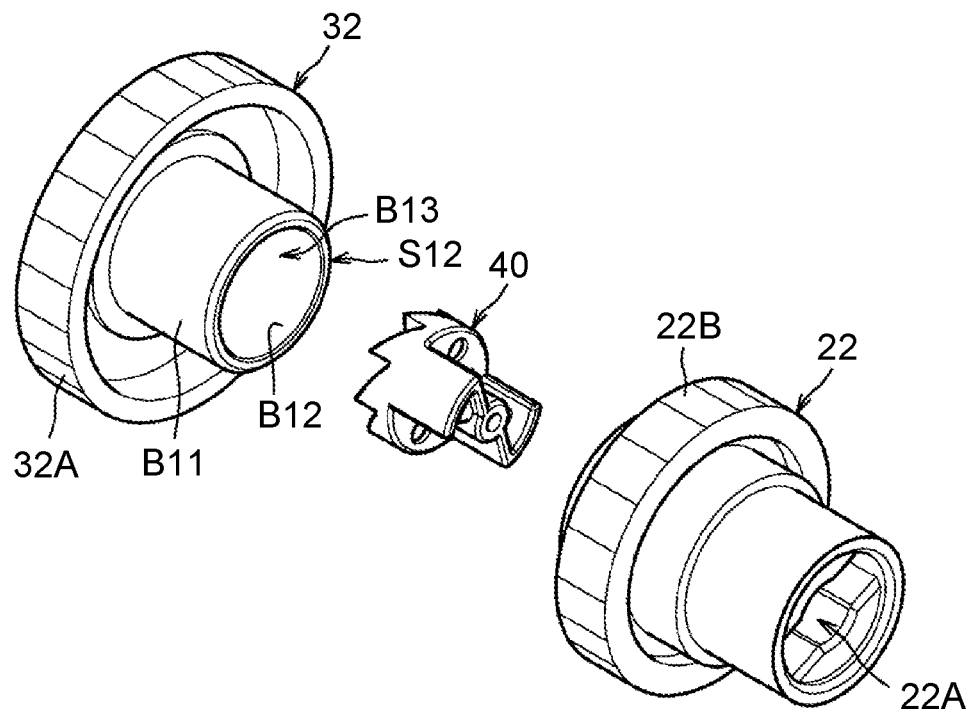
FIG. 6A includes an exploded perspective view illustrating a coupling gear, a clutch, and a second gear.
Figure 6B:
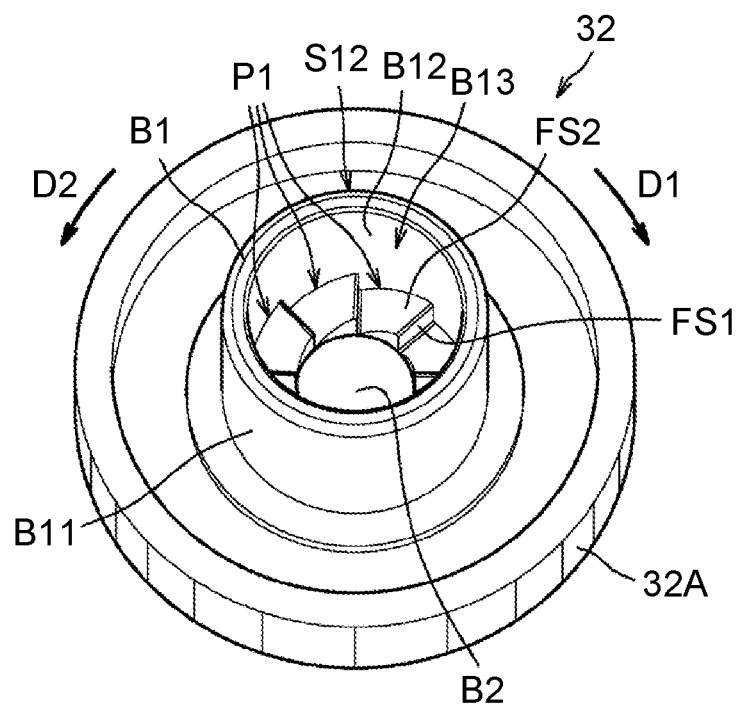
FIG. 6B is a perspective view of the second gear.

As illustrated in FIGS. 6 (a) and (b), the second gear 32 includes a gear portion 32A and a shaft S12. The shaft S12 has a cylindrical shape and supports the coupling 22 rotatably. The second gear 32 has a larger diameter than the coupling gear 22B.

A clutch 40 is positioned between the second gear 32 and the coupling 22 in the axial direction.

The shaft S12 supports the coupling 22 and the clutch 40 rotatably. Specifically, an outer circumferential surface B11 of the shaft S12 supports the coupling 22 rotatably. An inner circumferential surface B12 of the shaft S12 supports the clutch 40 rotatably. Specifically, the shaft S12 has a hole B13 recessed therein or extending therethrough in the axial direction. The clutch 40 is positioned in the hole B13. Therefore, the clutch 40 rotates along the inner circumferential surface B12 of the hole B13. That is, the clutch 40 is rotatable together with the coupling 22 and with respect to the shaft S12.

The shaft S12 includes a cylindrical wall B1, a bottom wall portion B2, and a plurality of first projections P1. The cylindrical wall B1 has a cylindrical shape. The cylindrical wall B1 has the outer circumferential surface B11 and the inner circumferential surface B12. The bottom wall portion B2 is positioned at an end portion of the cylindrical wall B1 that is on the other side in the axial direction. The bottom wall portion B2 has a disc-like shape.

The plurality of first projections P1 project from the bottom wall portion B2 toward the one side in the axial direction. The plurality of first projections P1 are arranged side by side in the direction of rotation of the coupling 22. The plurality of first projections P1 are annularly arranged side by side. The plurality of first projections P1 are positioned in the hole B13 of the cylindrical wall B1. The plurality of first projections P1 are positioned on a one side of the cylindrical wall B1 in the axial direction. The first projections P1 each have a rotation transmitting surface FS1 extending in the axial direction, and an inclined surface FS2 inclined with respect to the direction of rotation of the clutch 40.

The rotation transmitting surface FS1 crosses the direction of rotation of the clutch 40. More preferably, the rotation transmitting surface FS1 is orthogonal to the direction of rotation of the clutch 40. When the clutch 40 rotates in a counterclockwise direction D2, the rotation transmitting surface FS1 faces and comes into contact with the clutch 40 (specifically, a first clutch surface FC1 to be described below: see FIG. 7) in the counterclockwise direction D2.

The inclined surface FS2 is a surface for moving the clutch 40 from an engaged position toward a disengaged position when the clutch 40 rotates in a clockwise direction D1. The inclined surface FS2 is inclined with respect to the direction of rotation of the clutch 40. Specifically, the inclined surface FS2 is inclined toward the one side in the axial direction while extending in the clockwise direction D1.

Figure 7A:
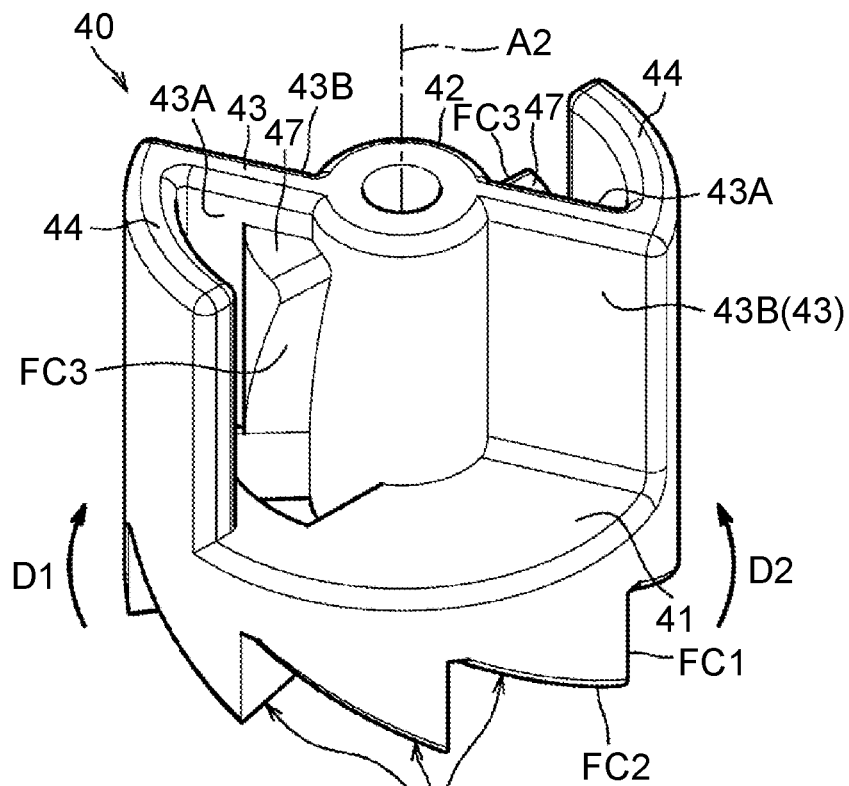
FIG. 7A illustrates the clutch and includes a perspective view seen from the one side in the axial direction.
Figure 7B:
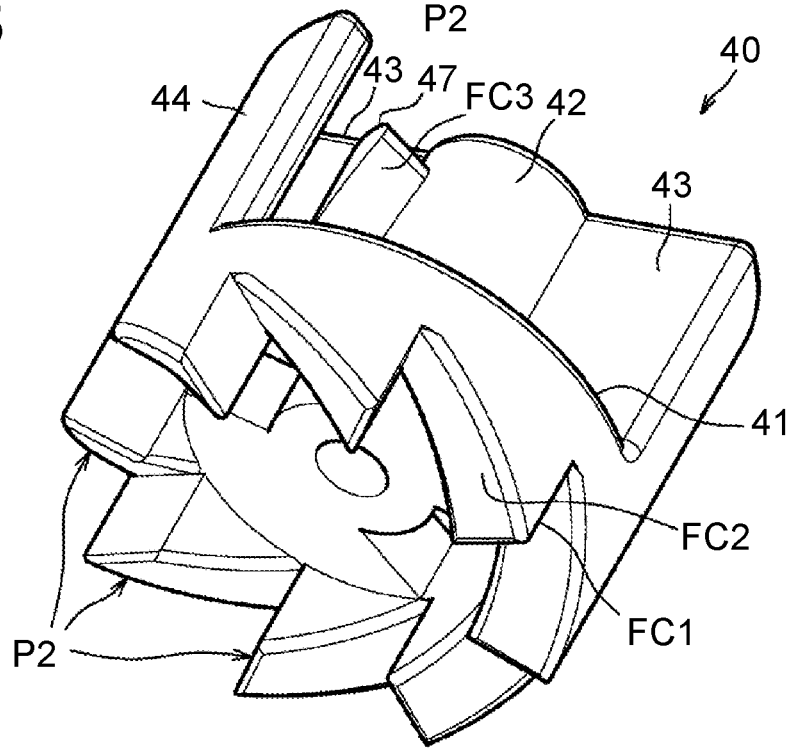
FIG. 7B is a perspective view seen from an other side in the axial direction.
Figure 8A:
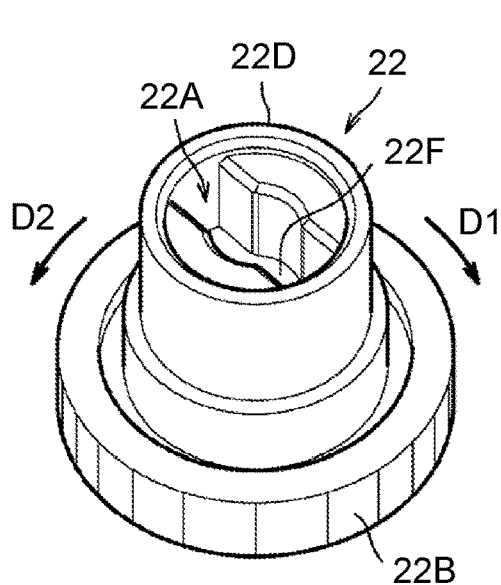
FIG. 8A illustrates the coupling and includes a perspective view seen from the one side in the axial direction.
Figure 8B:
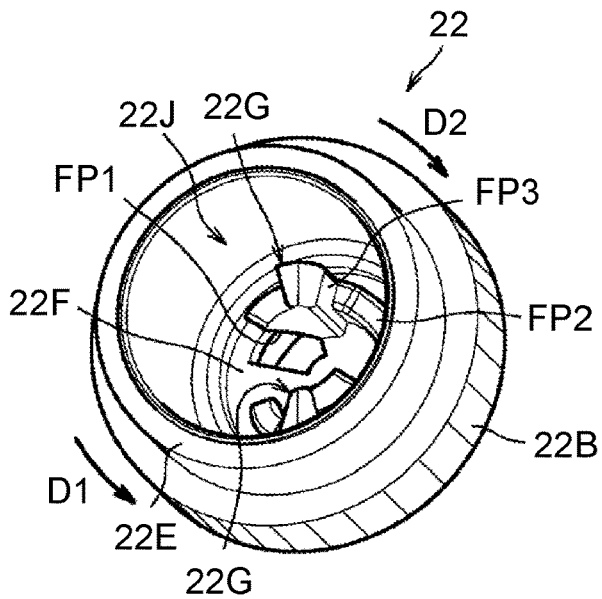
FIG. 8B is a perspective view and FIG. 8C is a plan view seen from the other side in the axial direction.
Figure 8C:
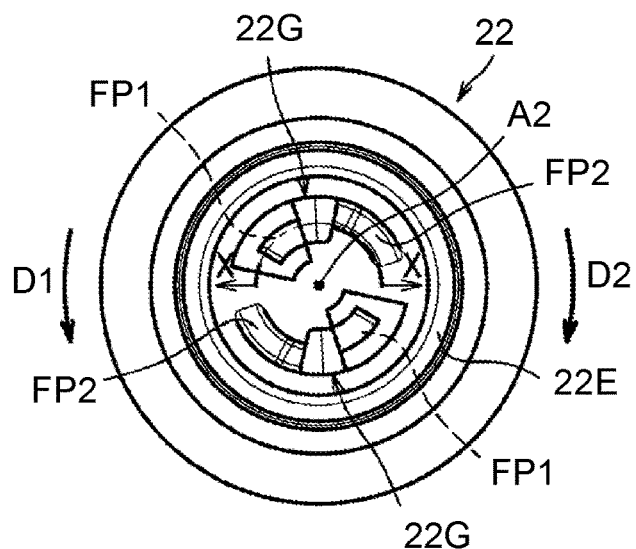
Figure 8D:
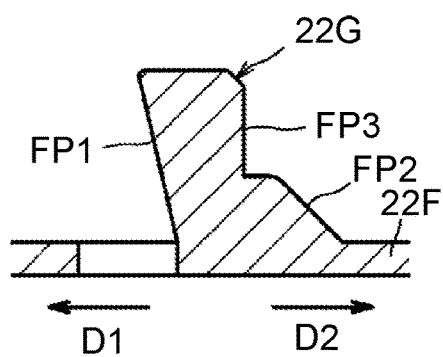
FIG. 8D is a X-X cross-sectional view of a protrusion of the coupling that is taken along a plane extending in a direction of rotation.

As illustrated in FIGS. 7 (a) and (b), the clutch 40 includes a disc-like base portion 41, a plurality of second projections P2, a shaft portion 42, a first wall 43, and an arc wall 44. The plurality of second projections P2 project from the base portion 41 toward the other side in the axial direction. The shaft portion 42, the first wall 43, and the arc wall 44 project from the base portion 41 toward the one side in the axial direction.

The plurality of second projections P2 are arranged side by side in the direction of rotation of the coupling 22. The plurality of second projections P2 are annularly arranged side by side. The second projections P2 each have the first clutch surface FC1 and a second clutch surface FC2. The first clutch surface FC1 extends in the axial direction. The second clutch surface FC2 is inclined with respect to the direction of rotation of the clutch 40.

The first clutch surface FC1 crosses the direction of rotation of the clutch 40. More preferably, the first clutch surface FC1 is orthogonal to the direction of rotation of the clutch 40. The first clutch surface FC1 is to be in contact with the rotation transmitting surface FS1 (see FIG. 6 (b)). Specifically, the first clutch surface FC1 is to be in surface contact with the rotation transmitting surface FS1.

The second clutch surface FC2 is a surface for moving the clutch 40 from the engaged position toward the disengaged position when the clutch 40 rotates in the clockwise direction D1. The second clutch surface FC2 is inclined with respect to the direction of rotation of the clutch 40. Specifically, the second clutch surface FC2 is inclined toward the base portion 41 while extending in the clockwise direction D1. The second clutch surface FC2 is to be in contact with the inclined surface FS2 (see FIG. 6 (b)). Specifically, the second clutch surface FC2 is to be in surface contact with the inclined surface FS2.

The shaft portion 42 extends from the center of the base portion 41 toward the one side of the clutch 40 in the axial direction. The shaft portion 42 has a cylindrical shape.

The first wall 43 extends from the shaft portion 42 toward the outer side in the radial direction. The first wall 43 has a first surface 43A and a second surface 43B. The first surface 43A and the second surface 43B are orthogonal to the direction of rotation. The first surface 43A faces toward the downstream side in the counterclockwise direction D2. The second surface 43B faces toward the upstream side in the counterclockwise direction D2. The first surface 43A has a third projection 47. The third projection 47 projects from the first surface 43A. The third projection 47 extends along the outer circumferential surface of the shaft portion 42. The third projection 47 has a third clutch surface FC3.

The third clutch surface FC3 is a surface for moving the clutch 40 from the engaged position toward the disengaged position when the coupling 22 rotates in the clockwise direction D1. The third clutch surface FC3 is inclined with respect to the direction of rotation of the clutch 40. Specifically, the third clutch surface FC3 is inclined toward the base portion 41 while extending in the clockwise direction D1. When the coupling 22 rotates in the clockwise direction D1, the third clutch surface FC3 comes into contact with a first coupling surface FP1 to be described below (see FIG. 8 (b) and FIG. 10 (b)).

The arc wall 44 extends in the counterclockwise direction D2 from an end portion of the first wall 43 that is on the outer side in the radial direction. The arc wall 44 has an arc shape centered at the second axis A2. The outer circumferential surface of the arc wall 44 and the outer circumferential surface of the base portion 41 are flush with each other. The outer circumferential surface of the arc wall 44 and the outer circumferential surface of the base portion 41 are rotatably supported by the inner circumferential surface B12 (see FIGS. 6 (a) and (b)) of the shaft S12. Specifically, the outer circumferential surface of the arc wall 44 and the outer circumferential surface of the base portion 41 form a cylindrical surface centered at the second axis A2. Furthermore, the inner circumferential surface B12 forms a cylindrical surface centered at the second axis A2. The outer circumferential surface of the arc wall 44 and the outer circumferential surface of the base portion 41 are in surface contact with the inner circumferential surface B12 of the shaft S12. Therefore, the clutch 40 moves in a direction along the second axis A2 while rotating about the second axis A2.

The first wall 43, the arc wall 44, the third clutch surface FC3, and the third projection 47 are each one of a pair provided symmetrically with respect to the second axis A2.

As illustrated in FIGS. 8 (a) and (b), the coupling 22 further includes a first cylindrical portion 22D and a second cylindrical portion 22E illustrated in FIG. 8 (b). The first cylindrical portion 22D and the second cylindrical portion 22E each have a cylindrical shape.

As illustrated in FIG. 8 (b), the coupling 22 includes a separating wall 22F. The separating wall 22F is positioned between the second cylindrical portion 22E and the first cylindrical portion 22D. The separating wall 22F separates a space in the second cylindrical portion 22E and a space in the first cylindrical portion 22D from each other. The first cylindrical portion 22D and the separating wall 22F define the recessed portion 22A. On the other hand, the second cylindrical portion 22E and the separating wall 22F define a second recessed portion 22J. The second cylindrical portion 22E is fitted around the outer circumferential surface B11 (see FIGS. 6 (a) and (b)) of the shaft S12 and is rotatably supported by the shaft S12.

The coupling 22 includes protrusions 22G. The protrusions 22G are provided as a pair that are symmetrical with respect to the second axis A2. The protrusions 22G are positioned in the second recessed portion 22J. The protrusions 22G protrude from the separating wall 22F. The protrusions 22G each have the first coupling surface FP1, a second coupling surface FP2, and a third coupling surface FP3.

The first coupling surface FP1 is a surface for moving the clutch 40 from the engaged position toward the disengaged position when the clutch 40 rotates in the clockwise direction D1. The first coupling surface FP1 faces toward the downstream side in the clockwise direction D1. The first coupling surface FP1 is inclined with respect to the direction of rotation of the coupling 22. Specifically, as illustrated in FIGS. 8 (c) and (d), the first coupling surface FP1 is inclined in such a manner as to be away from the separating wall 22F while extending in the clockwise direction D1.

The second coupling surface FP2 is a surface for moving the clutch 40 from the disengaged position toward the engaged position when the coupling 22 rotates in the counterclockwise direction D2. The second coupling surface FP2 faces toward the downstream side in the counterclockwise direction D2. The second coupling surface FP2 is inclined with respect to the direction of rotation of the coupling 22. Specifically, the second coupling surface FP2 is inclined in such a manner as to be closer to the separating wall 22F while extending in the counterclockwise direction D2. The second coupling surface FP2 is to be in contact with an end portion of the respective first wall 43 of the clutch 40.

The third coupling surface FP3 is a surface that is to be in contact with the respective first wall 43 of the clutch 40 in the direction of rotation when the coupling 22 rotates in the counterclockwise direction D2. The third coupling surface FP3 is positioned farther from the separating wall 22F than from the second coupling surface FP2. The third coupling surface FP3 crosses the direction of rotation of the coupling 22. More preferably, the third coupling surface FP3 is orthogonal to the direction of rotation of the coupling 22.

Figure 9A:
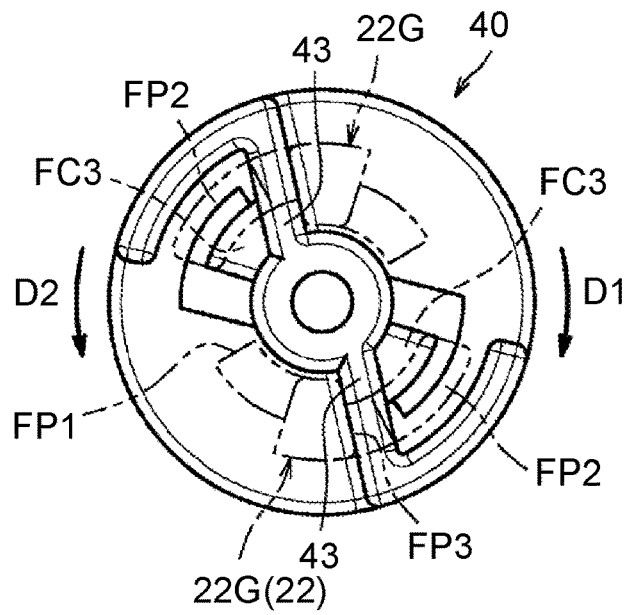
FIG. 9A and FIG. 9B include diagrams illustrating a relationship among relevant elements of the coupling, the clutch, and a shaft, with the clutch being at an engaged position.
Figure 9B:
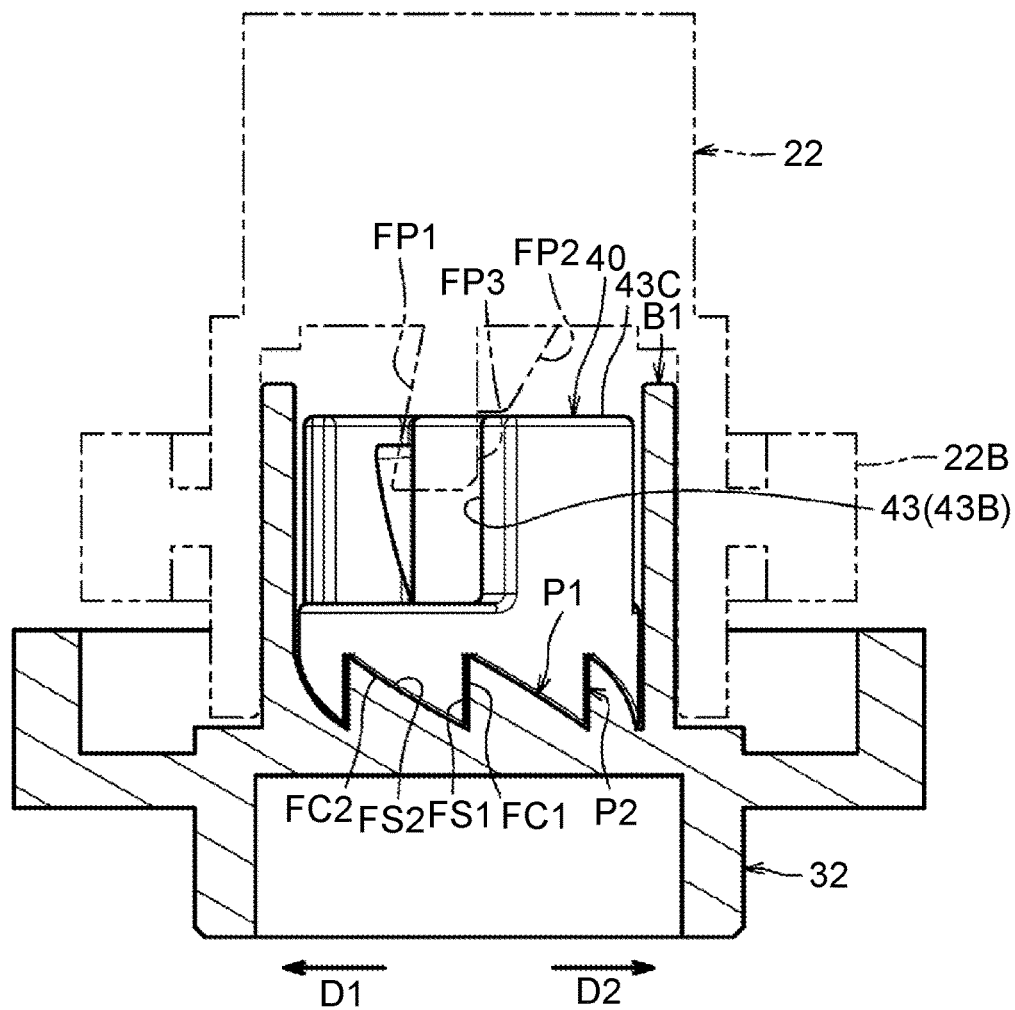
Figure 10A:
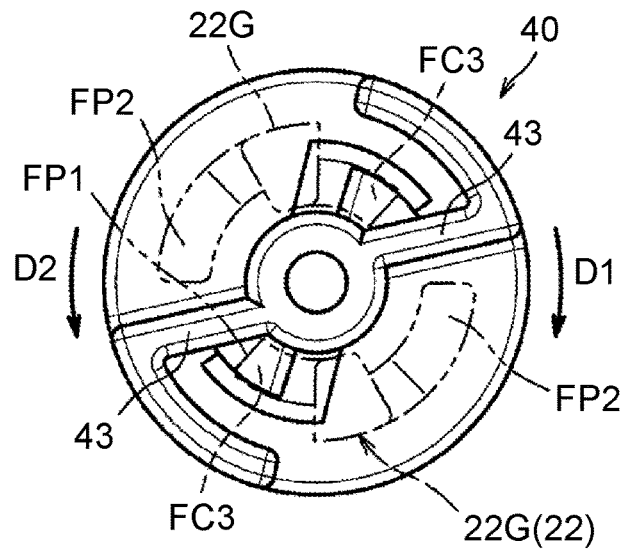
FIG. 10A and FIG. 10B include diagrams illustrating a relationship among relevant elements of the coupling, the clutch, and the shaft, with the clutch being at a disengaged position.
Figure 10B:
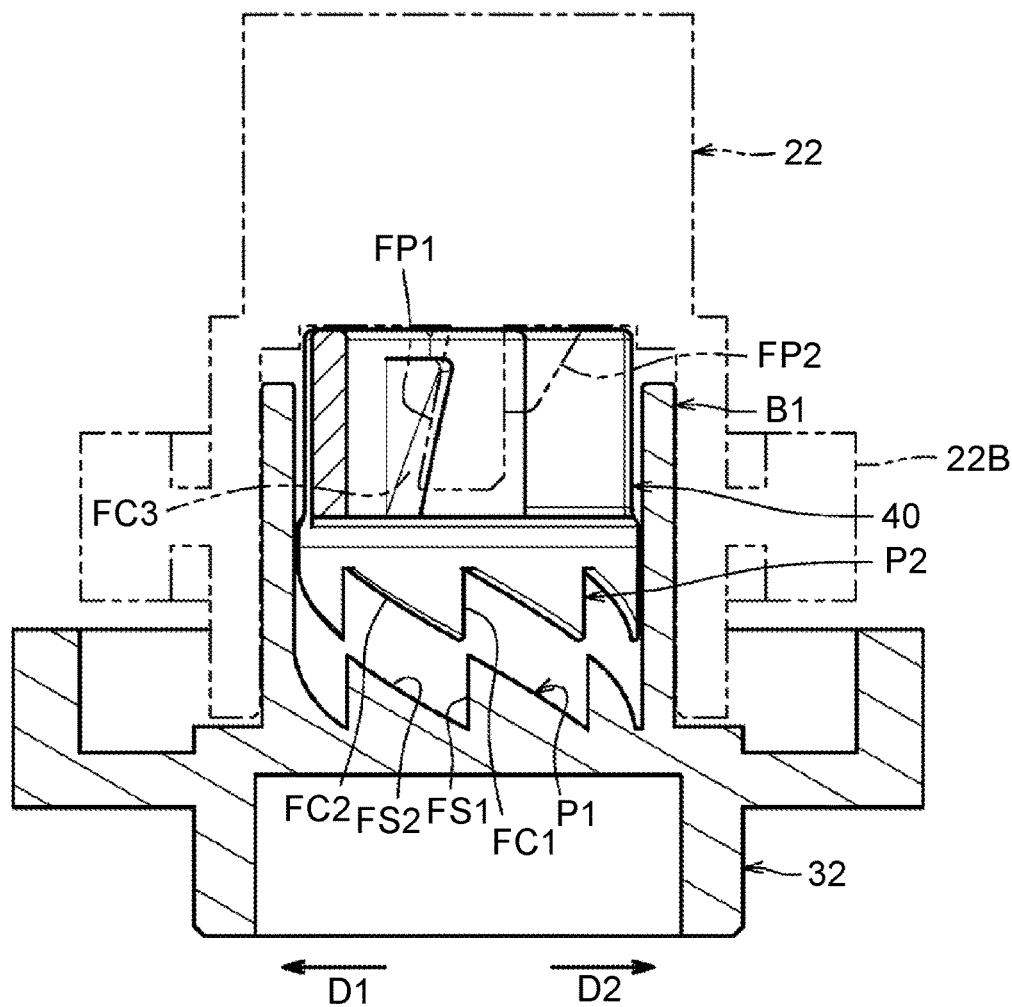

As illustrated in FIGS. 9 and 10, the first walls 43 of the clutch 40 are each positioned between the protrusions 22G of the coupling 22 in the direction of rotation. The clutch 40 rotates together with the coupling 22. Therefore, the clutch 40 is rotatable together with the coupling 22.

The clutch 40 is movable in the axial direction with respect to the shaft S12. The clutch 40 is movable in the axial direction between the engaged position (see FIG. 9) where the clutch 40 is in engagement with the first projections P1 forming a portion of the second gear 32 in the direction of rotation and the disengaged position (see FIG. 10) where the clutch 40 is out of engagement with the first projections P1 forming the portion of the second gear 32.

As illustrated in FIGS. 9 (a) and (b), the clutch 40 moving to the engaged position with the rotation of the coupling 22 in the counterclockwise direction D2 comes into engagement with the first projections P1 forming the portion of the second gear 32 and causes the second gear 32 to rotate together with the coupling gear 22B in the counterclockwise direction D2.

Note that the coupling 22 that has come into contact with the gear cover 21 does not move with respect to the shaft S12 in a direction away from the side face 11F of the casing 11. Herein, the expression "the coupling 22 does not move with respect to the shaft S12" implies a case where the coupling 22 does not move at all, as well as a case where the coupling 22 slightly moves with backlash. Furthermore, the clutch 40 described above is movable in the axial direction with respect to the coupling 22 as well.

A more specific mechanism of the above operation is as follows. When the coupling 22 rotates in the counterclockwise direction D2 with the clutch 40 being at the disengaged position (see FIGS. 10 (a) and (b)), the second coupling surface FP2 of the coupling 22 comes into contact with an end portion of the second surface 43B of the first wall 43 of the clutch 40 in the direction of rotation. Hence, the second coupling surface FP2 inclined with respect to the direction of rotation urges the clutch 40 toward the first projections P1 of the second gear 32.

The clutch 40 moves toward the other side in the axial direction and away from the second coupling surface FP2, and the second projections P2 come into mesh with the first projections P1. Then, the first clutch surfaces FC1 of the plurality of second projections P2 come into contact with the respective rotation transmitting surfaces FS1 of the plurality of first projections P1. Subsequently, as the coupling 22 slightly rotates in the counterclockwise direction D2, the third coupling surfaces FP3 come into contact with the first walls 43 of the clutch 40 in the direction of rotation.

Thus, a driving force is transmitted from the coupling 22 to the clutch 40. Furthermore, the rotation transmitting surfaces FS1 transmit a driving force acting in the counterclockwise direction D2 from the clutch 40 to the second gear 32. Consequently, the coupling 22, the clutch 40, and the second gear 32 altogether rotate in the counterclockwise direction D2.

On the other hand, as illustrated in FIGS. 10 (a) and (b), the clutch 40 moving to the disengaged position with the rotation of the coupling 22 in the clockwise direction D1 goes out of engagement with the first projections P1 of the second gear 32 and does not causes the second gear 32 to rotate together with the coupling 22.

A more specific mechanism of the above operation is as follows. When the coupling 22 rotates in the clockwise direction D1 with the clutch 40 being at the engaged position (see FIGS. 9 (a) and (b)), the first coupling surfaces FP1 of the coupling 22 push the third clutch surfaces FC3 of the clutch 40 in the clockwise direction D1. Hence, the clutch 40 rotates together with the coupling 22 in the clockwise direction D1.

Furthermore, since the clutch 40 rotates in the clockwise direction D1, the second clutch surfaces FC2 of the plurality of second projections P2 come into contact with the respective inclined surfaces FS2 of the plurality of first projections P1. Therefore, the clutch 40 is pushed by the inclined surfaces FS2 toward the one side in the axial direction and moves from the engaged position toward the disengaged position. Thus, the second projections P2 are disengaged from the respective first projections P1 in the axial direction. That is, the engagement between the second projections P2 and the first projections P1 is disabled. Subsequently, the first coupling surfaces FP1 of the coupling 22 further push the third clutch surfaces FC3 of the clutch 40 toward the disengaged position. Thus, the clutch 40 reaches the disengaged position. In this state, the second projections P2 are spaced apart from the first projections P1 in the axial direction. Therefore, the rotation of the clutch 40 is not transmitted to the second gear 32. That is, the second gear 32 can rotate independently of the clutch 40.

Now, operations of relevant members at the rotation of the coupling 22 in the clockwise direction D1 or in the counterclockwise direction D2 will be described.

As illustrated in FIGS. 11 (a) and (b), when the controller CU controls the motor 8 in such a manner as to rotate the coupler 7 in the clockwise direction D1, the coupling gear 22B (the coupling 22) rotates in the clockwise direction D1. In this case, the moving gear 33 rotates (orbits) clockwise together with the coupling gear 22B and reaches the second position, where the moving gear 33 comes into mesh with the small-diameter gear 31B of the first gear 31. Thus, the rotation of the coupling gear 22B in the clockwise direction D1 causes the moving gear 33 that is in mesh with the coupling gear 22B to rotate counterclockwise and causes the first gear 31 that is in mesh with the moving gear 33 to rotate clockwise.

Since the first gear 31 rotates clockwise, the first idle gear 34 rotates counterclockwise. The second idle gear 35 that is in mesh with the first idle gear 34 rotates clockwise. Furthermore, the developing roller gear 23 and the supply roller gear 24, which are in mesh with the second idle gear 35, rotate counterclockwise. Accordingly, the developing roller 12 and the supply roller 13 rotate counterclockwise. Furthermore, the first agitator 14 that rotates together with the first gear 31 also rotates.

As described above, when the coupling 22 rotates in the clockwise direction D1, the first agitator 14, the developing roller 12, and the supply roller 13 are rotated, whereby an image can be formed.

Furthermore, since the moving gear 33 is at the second position, the moving gear 33 is out of mesh with the transporting gear 26. Therefore, the transporting gear 26 does not rotate. Accordingly, the third idle gear 36, the fourth idle gear 37, and the agitator gear 25 do not rotate, either. Consequently, the auger 16 and the second agitator 15 do not rotate, and the toner T is not transported from the toner accommodation chamber 11B to the developing chamber 11A.

Note that, in this case, since the clutch 40 is out of engagement with the first projections P1 forming the portion of the second gear 32, the second gear 32 does not rotate by the engagement with the clutch 40. However, the clockwise rotation of the first gear 31 causes the second gear 32 that is in mesh with the first gear 31 to rotate in the counterclockwise direction D2.

On the other hand, as illustrated in FIGS. 12 (a) and (b), when the controller CU controls the motor 8 in such a manner as to rotate the coupler 7 in the counterclockwise direction D2, the coupling gear 22B (the coupling 22) rotates in the counterclockwise direction D2. In this case, the moving gear 33 rotates (orbits) counterclockwise together with the coupling gear 22B and reaches the first position, where the moving gear 33 goes out of mesh with the first gear 31. Thus, the rotation of the coupling gear 22B in the counterclockwise direction D2 causes the second gear 32 to rotate in the counterclockwise direction D2 together with the coupling gear 22B with the aid of the clutch 40 and causes the first gear 31 that is in mesh with the second gear 32 to rotate clockwise.

Since the first gear 31 rotates clockwise, as with the case where the coupling gear 22B rotates in the clockwise direction D1, the developing roller gear 23 and the supply roller gear 24, which are in mesh with the second idle gear 35, rotate counterclockwise with the aid of the first idle gear 34 and the second idle gear 35. Accordingly, the developing roller 12 and the supply roller 13 rotate counterclockwise. Furthermore, the first agitator 14 that rotates together with the first gear 31 also rotates.

As described above, when the coupling 22 rotates in the counterclockwise direction D2, the first agitator 14, the developing roller 12, and the supply roller 13 are rotated, whereby an image can be formed.

Furthermore, since the moving gear 33 is at the first position, the moving gear 33 is in mesh with the transporting gear 26. Therefore, the transporting gear 26 rotates counterclockwise. When the transporting gear 26 rotates counterclockwise, the third idle gear 36 rotates clockwise. When the third idle gear 36 rotates clockwise, the fourth idle gear 37 rotates counterclockwise. When the fourth idle gear 37 rotates counterclockwise, the agitator gear 25 rotates clockwise.

As described above, when the coupling 22 rotates in the counterclockwise direction D2, the transporting gear 26, the third idle gear 36, the fourth idle gear 37, and the agitator gear 25 rotate. Consequently, the auger 16 and the second agitator 15 rotate. Hence, the toner T can be transported from the toner accommodation chamber 11B to the developing chamber 11A. That is, when the coupling 22 rotates in the clockwise direction D1, the toner T can be transported from the toner accommodation chamber 11B to the developing chamber 11A while an image is formed.

Note that the above operations of the relevant members are also implemented even if the developing cartridge 10 is detached from the drum cartridge 5.

Now, the controller CU will be described.

The controller CU executes a receiving step of receiving a printing command.

Furthermore, when the controller CU receives a printing command in the receiving step, the controller CU executes a first judging step of judging whether the remaining toner amount AT in the developing chamber 11A is smaller than or equal to a first predetermined value ATth1, and a transmitting step of transmitting a command for controlling the motor 8 to the motor 8. In the transmitting step, if the remaining toner amount is judged to be smaller than or equal to the first predetermined value in the first judging step, a command for causing the coupler 7 to take the second state is transmitted to the motor 8. If the remaining toner amount is not judged to be smaller than or equal to the first predetermined value ATth1 in the first judging step, a command for causing the coupler 7 to take the first state is transmitted to the motor 8. That is, when the motor 8 is reversely rotated, the toner T is supplied from the toner accommodation chamber 11B into the developing chamber 11A. When the motor 8 is normally rotated, the toner T is not supplied from the toner accommodation chamber 11B into the developing chamber 11A.

If the controller CU receives a printing command for image formation of a plurality of pages in the receiving step and judges that the remaining toner amount AT is smaller than or equal to the first predetermined value ATth1 in the first judging step, the controller CU can transmit in the transmitting step the command for causing the coupler 7 to take the second state to the motor 8 when the first page is to be printed, and can transmit the command for causing the coupler 7 to take the first state to the motor 8 when the second and subsequent pages are to be printed. Herein, the expression "when the second and subsequent pages are to be printed" is intended additionally to include cases where the command for causing the coupler to take the first state is transmitted to the motor 8 after printing two pages when the third and subsequent pages are to be printed and when after printing three pages the fourth and subsequent pages are to be printed.

If the controller CU judges in the first judging step that the remaining toner amount AT is smaller than or equal to the first predetermined value ATth1, the controller CU further executes a second judging step of judging whether the remaining toner amount AT is smaller than or equal to a second predetermined value ATth2 that is smaller than the first predetermined value ATth1. If the controller CU judges in the second judging step that the remaining toner amount AT is smaller than or equal to the second predetermined value ATth2, the controller CU can transmit in the transmitting step the command for causing the coupler 7 to take the second state to the motor 8.

If the controller CU receives a printing command for image formation of a plurality of pages in the receiving step and judges that the remaining toner amount AT is smaller than or equal to the second predetermined value ATth2 in the second judging step, the controller CU can transmit in the transmitting step the command for causing the coupler 7 to take the second state to the motor 8 when the first page is to be printed, and can transmit the command for causing the coupler 7 to take the first state to the motor 8 when the second and subsequent pages are to be printed. Herein, the expression "when the second and subsequent pages are to be printed" is intended additionally to include cases where the command for causing the coupler to take the first state is transmitted to the motor 8 after printing two pages when the third and subsequent pages are to be printed and when after printing three pages the fourth and subsequent pages are to be printed.

If the controller CU judges in the second judging step that the remaining toner amount AT is not smaller than or equal to the second predetermined value ATth2, the controller CU can transmit in the transmitting step the command for causing the coupler 7 to take the second state with any of timings including at least before the start of printing, after the completion of printing, and between pages.

Now, a specific example of the above process that is realized by the controller CU will be described with reference to flow charts. The flow charts illustrated in FIGS. 13, 15, and 17 each illustrate a process to be executed after a printing command is received. In the following description of the flow charts, to transmit in the transmitting step, to the motor 8, the command for causing the coupler 7 to take the first state is referred to as to normally rotate the motor 8, and to transmit, to the motor 8, the command for causing the coupler 7 to take the second state is referred to as to reversely rotate the motor 8, as a matter of convenience.

As illustrated in FIG. 13, after the controller CU receives a printing command, the controller CU judges whether the remaining toner amount AT is smaller than or equal to the first predetermined value ATth1 (the first judging step in S10). If the controller CU judges that the remaining toner amount AT is not smaller than or equal to the first predetermined value ATth1 (No in S10), the controller CU executes a printing operation by performing steps S40 to S49.

Specifically, the controller CU first normally rotates the motor 8 (the transmitting step in S40).

Subsequently, the controller CU executes an operation of printing one page (S41) and judges whether there is a next page to be printed (S42). If the controller CU judges that there is a next page (Yes in S42), the process returns to step S41, in which the next page is printed. If the controller CU judges that there is no next page (No in S42), the controller CU stops the motor (S49), thereby ending the process.

On the other hand, in step S10, if the controller CU judges that the remaining toner amount AT is smaller than or equal to the first predetermined value ATth1 (Yes in S10), the controller CU reversely rotates the motor 8 (see S21 and S22).

Specifically, in step S10, if the controller CU judges that the remaining toner amount AT is smaller than or equal to the first predetermined value ATth1 (Yes in S10), the controller CU judges whether the remaining toner amount AT is smaller than or equal to the second predetermined value ATth2 (the second judging step in S20).

If the controller CU judges that the remaining toner amount AT is not smaller than or equal to the second predetermined value ATth2 (No in S20), the controller CU reversely rotates the motor for a predetermined period (the transmitting step in S21), and then executes an operation of printing all pages (S40 to S49).

Figure 14A:
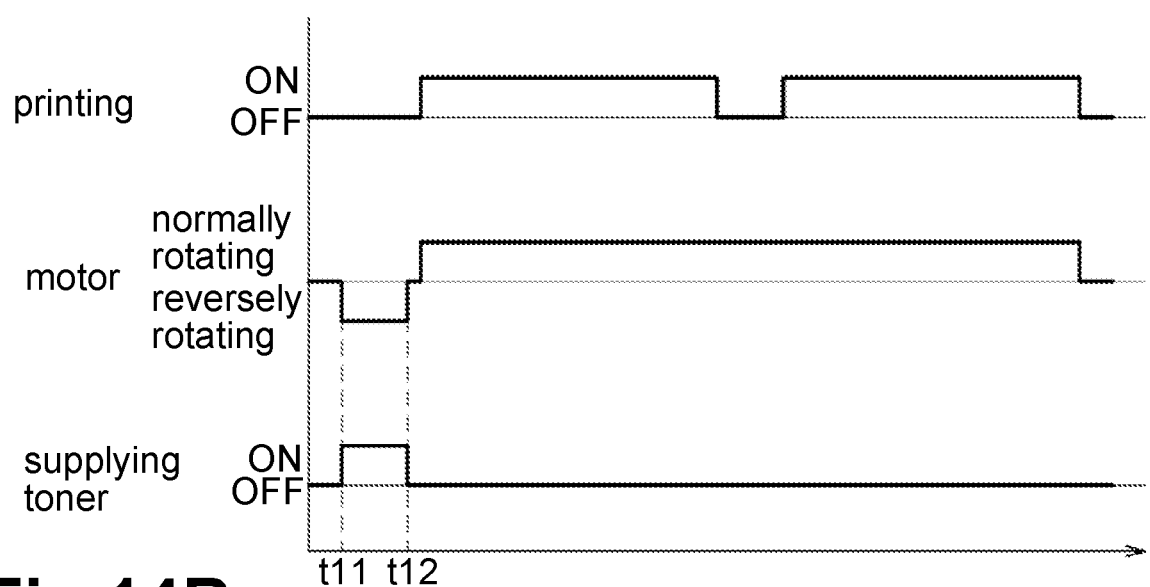
FIG. 14A and FIG. 14B include examples of a timing chart regarding a printing operation, a motor, and toner supply.
Figure 14B:
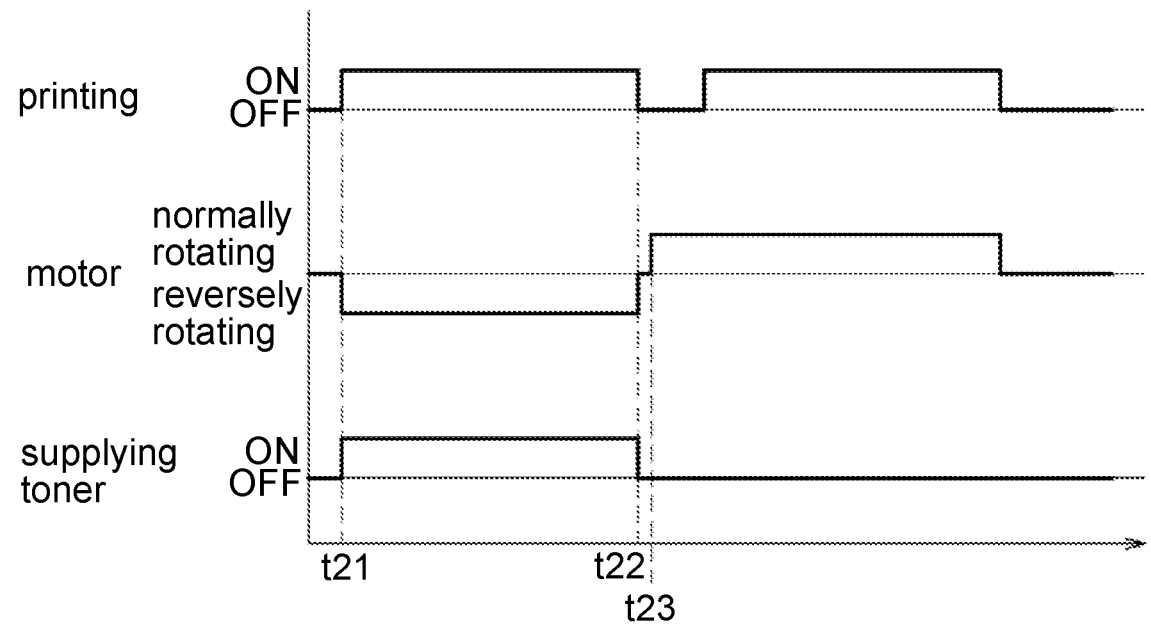

Thus, if the remaining toner amount AT is smaller than or equal to the first predetermined value ATth1 and greater than the second predetermined value ATth2, as illustrated in FIG. 14 (a), the controller CU that has received the printing command reversely rotates the motor 8 for a period from t11 to t12, which is the timing before the start of printing, thereby supplying the toner T from the toner accommodation chamber 11B into the developing chamber 11A. Subsequently, the operation of printing all pages can be realized.

Referring to FIG. 13 again, if the controller CU judges that the remaining toner amount AT is smaller than or equal to the second predetermined value ATth2 (Yes in S20), the controller CU reversely rotates the motor 8 (the transmitting step in S22) and then prints a particular number of pages (S31 to S33). Specifically, after one page is printed (S31), the controller CU judges whether there is a next page (S32). If the controller CU judges that there is no next page (No in S32), the process proceeds to step S49, in which the controller CU stops the motor 8, thereby ending the process. In contrast, if the controller CU judges that there is a next page (Yes in S32), the controller CU judges whether all of the particular number of pages has been printed (S33). If the controller CU judges that all of the particular number of pages has not been printed (No in S33), the process returns to step S31, and the controller CU repeats the process.

In step S33, if the controller CU judges that all of the particular number of pages has been printed (Yes in S33), the process proceeds to step S40, in which the controller CU executes an operation of printing all of the remaining pages (S40 to S49).

Thus, if the remaining toner amount AT is smaller than or equal to the second predetermined value ATth2, an operation illustrated in FIG. 14 (b) can be realized. Specifically, the controller CU that has received a printing command reversely rotates the motor 8 for a period from t21 to t22, thereby printing the particular number of pages while supplying the toner T from the toner accommodation chamber 11B into the developing chamber 11A. After t23, the controller CU normally rotates the motor 8, thereby printing the remaining pages without supplying the toner T from the toner accommodation chamber 11B into the developing chamber 11A.

Now, another example of the process executed by the controller CU will be described with reference to FIG. 15.

Figure 15:
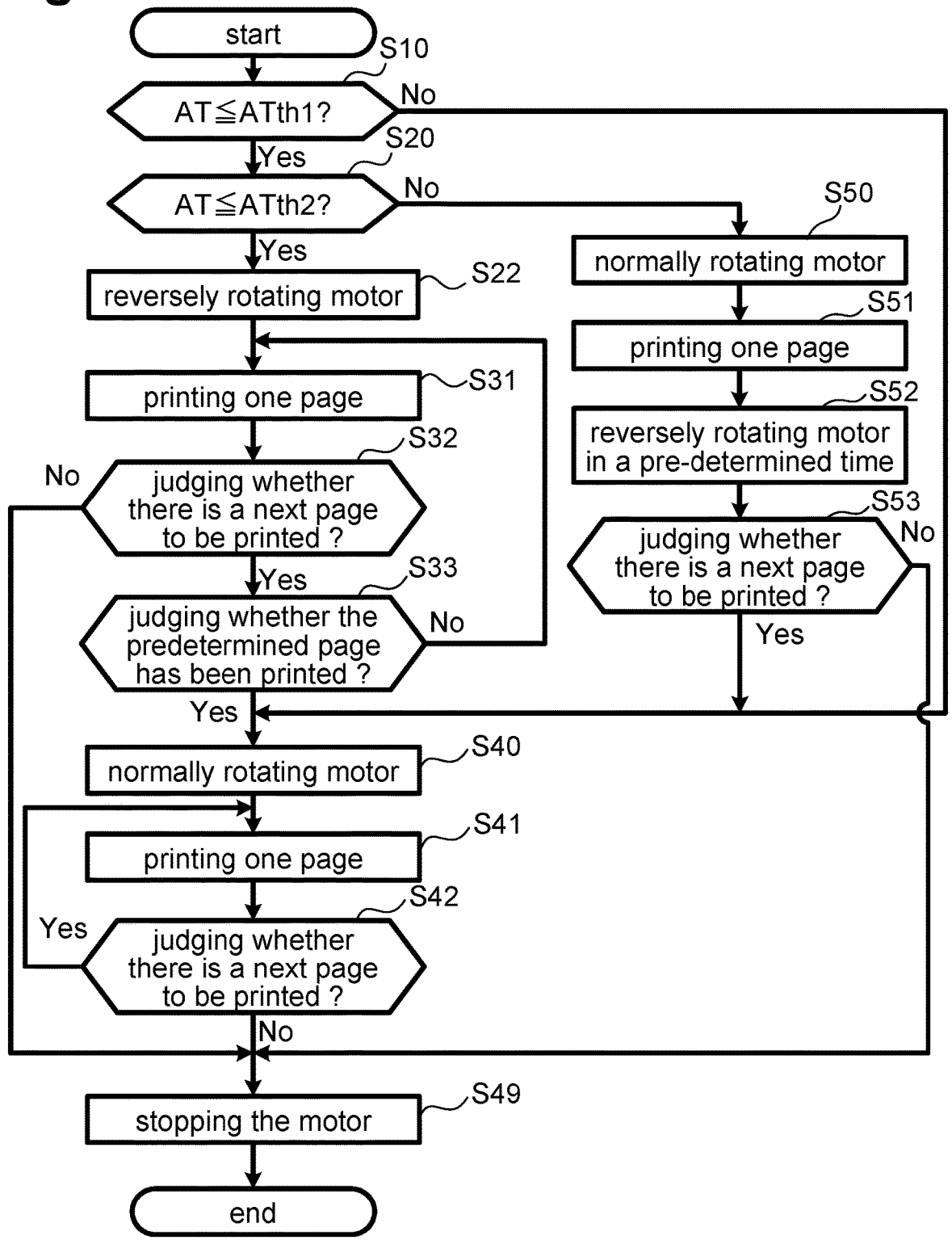
FIG. 15 is a flow chart illustrating another example of the process executed by the controller.

Steps S10 to S49 illustrated in FIG. 15 are the same as those illustrated in FIG. 13, and description thereof is omitted.

In step S20, if the controller CU judges that the remaining toner amount AT is not smaller than or equal to the second predetermined value ATth2 (No in S20), the controller CU normally rotates the motor 8 (S50).

Then, the controller CU prints one page (S51). Subsequently, the controller CU reversely rotates the motor for a predetermined period (S52). Note that step S51 may be set such that a plurality of pages, not one page, are printed.

The controller CU judges whether or not there is another page (S53). If the controller CU judges that there is (Yes in S53), the controller CU executes a process of printing all of the remaining pages by performing steps S40 to S49. In contrast, if the controller CU judges in step S53 that there is no next page (No in S53), the controller CU stops the motor (S49), thereby ending the process.

Figure 16:
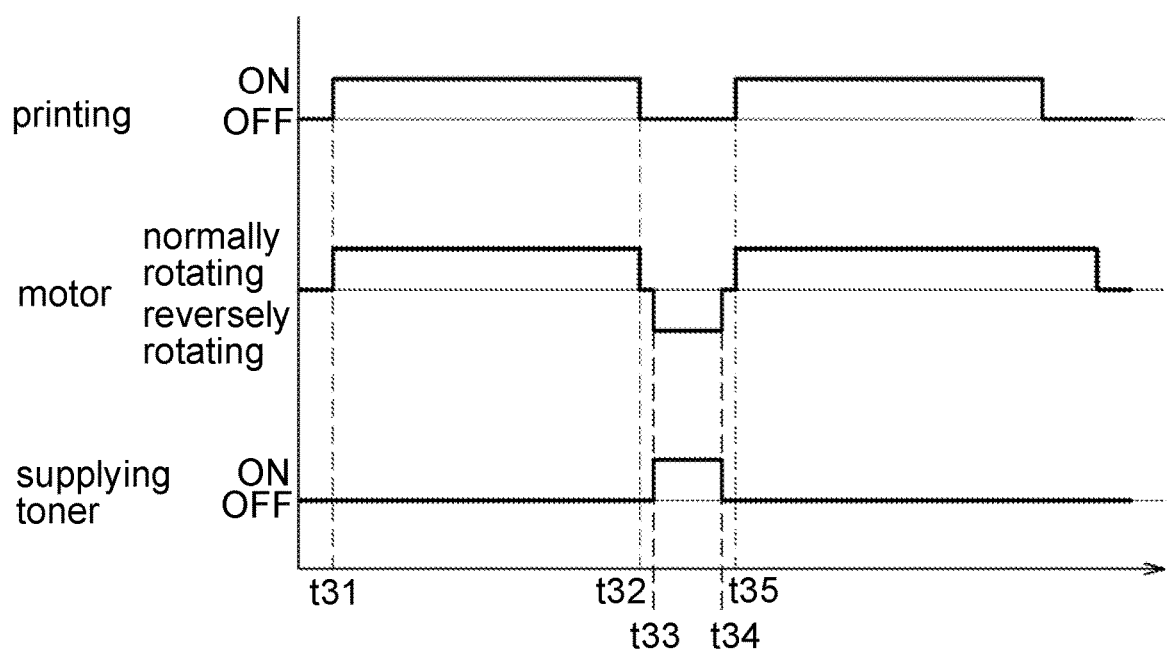
FIG. 16 is another example of the timing chart regarding the printing operation, the motor, and the toner supply.

Thus, if the remaining toner amount AT is smaller than or equal to the first predetermined value ATth1 and greater than the second predetermined value ATth2, an operation illustrated in FIG. 16 can be realized. Specifically, the controller CU that has received a printing command normally rotates the motor 8 for a period from t31 to t32, thereby printing one page without supplying the toner T from the toner accommodation chamber 11B into the developing chamber 11A. Subsequently, the controller CU reversely rotates the motor 8 for a period from t33 to t34, which is the timing between pages, thereby supplying the toner T from the toner accommodation chamber 11B into the developing chamber 11A. Subsequently, after t35, the controller CU normally rotates the motor 8, thereby printing all of the remaining pages without supplying the toner T from the toner accommodation chamber 11B into the developing chamber 11A.

Now, yet another example of the process executed by the controller CU will be described with reference to FIG. 17.

Figure 17:
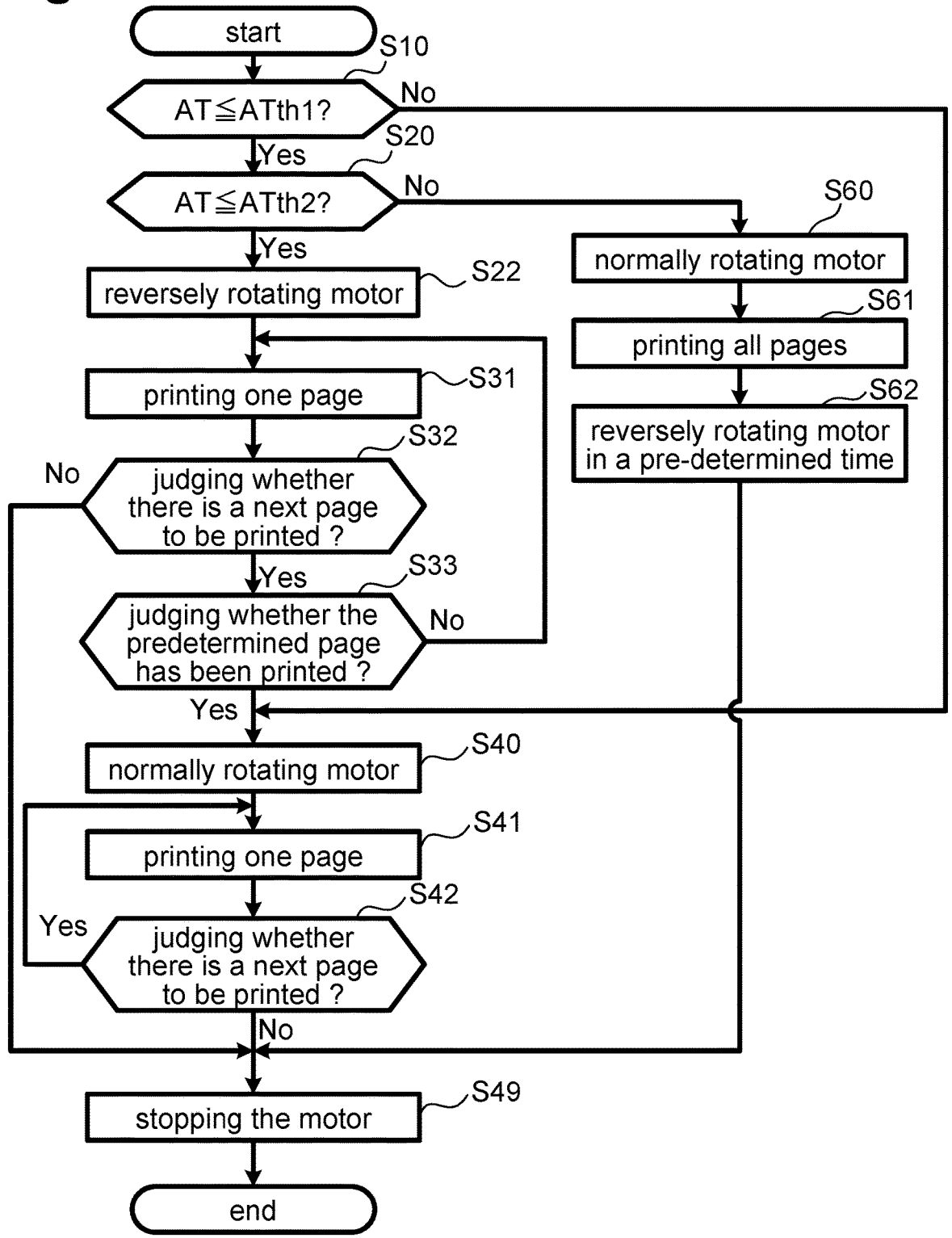
FIG. 17 is a flow chart illustrating yet another example of the process executed by the controller.

Steps S10 to S49 illustrated in FIG. 17 are the same as those illustrated in FIG. 13, and description thereof is omitted.

In step S20, if the controller CU judges that the remaining toner amount AT is not smaller than or equal to the second predetermined value ATth2 (No in S20), the controller CU normally rotates the motor 8 (S60).

Then, the controller CU prints all pages (S61). Subsequently, the controller CU reversely rotates the motor for a predetermined period (S62), and stops the motor (S49), thereby ending the process.

Figure 18:
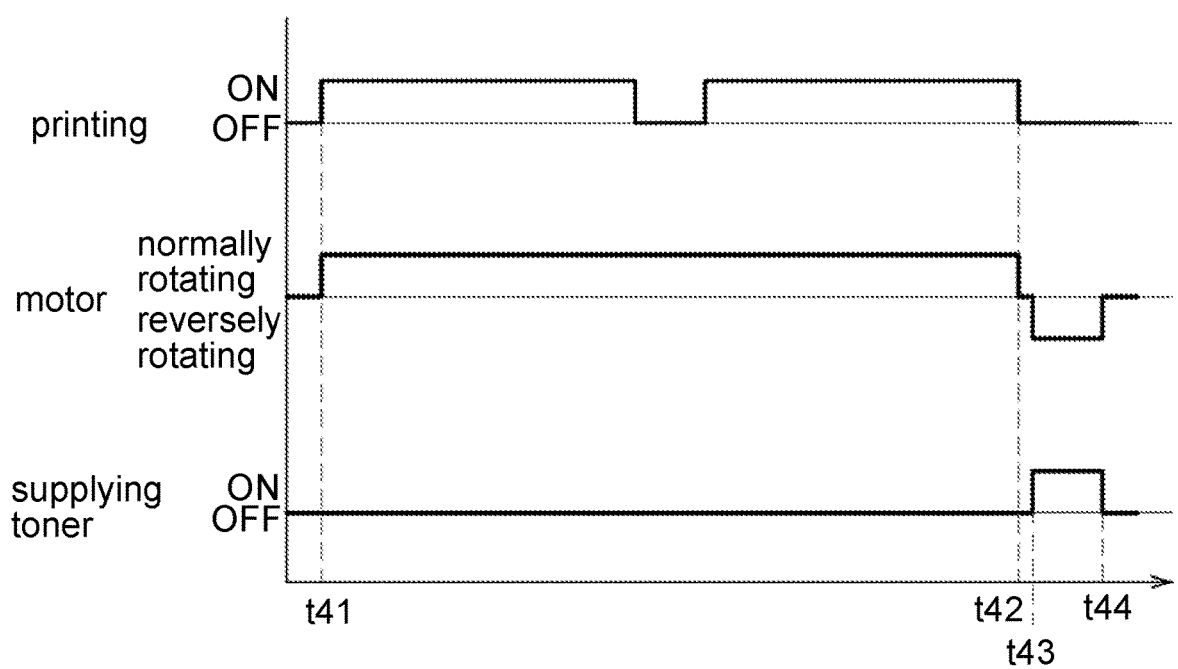
FIG. 18 is yet another example of the timing chart regarding the printing operation, the motor, and the toner supply.

Thus, if the remaining toner amount AT is smaller than or equal to the first predetermined value ATth1 and greater than the second predetermined value ATth2, an operation illustrated in FIG. 18 can be realized. Specifically, the controller CU that has received a printing command normally rotates the motor 8 for a period from t41 to t42, thereby printing all pages without supplying the toner T from the toner accommodation chamber 11B into the developing chamber 11A. Subsequently, the controller CU reversely rotates the motor 8 for a period from t43 to t44, which is the timing after the completion of printing, thereby supplying the toner T from the toner accommodation chamber 11B into the developing chamber 11A.

As described above, the developing cartridge 10 and the image forming apparatus 1 according to the present embodiment can produce the following advantageous effects.

In either case where the coupling 22 is rotated in the clockwise direction D1 or in the counterclockwise direction D2, the first gear 31 can be rotated clockwise and the developing roller 12 can be rotated in the same direction. That is, in both cases where the coupling 22 is rotated in the clockwise direction D1 and in the counterclockwise direction D2, the developing roller 12 is not reversely rotated. Therefore, toner leakage is less likely to occur.

Furthermore, the moving gear 33 includes the large-diameter gear 33B and the small-diameter gear 33A that rotate together. The large-diameter gear 33B is in mesh with the first gear 31. The small-diameter gear 33A is in mesh with the coupling gear 22B. The second gear 32 has a greater diameter than the coupling gear 22B. Therefore, when the coupling 22 is rotated in the clockwise direction D1, the first gear 31 is rotated at a speed increased by the moving gear 33. In contrast, when the coupling 22 is rotated in the counterclockwise direction D2, the first gear 31 is rotated at a speed increased by the second gear 32. Hence, the difference in the speed of the developing roller 12 between the case of rotating the coupling 22 in the clockwise direction D1 and the case of rotating the coupling 22 in the counterclockwise direction D2 can be reduced.

Furthermore, in the developing cartridge 10, the developing roller 12 can be made to rotate by rotating the coupling 22 in the clockwise direction D1, and the toner T can be supplied by rotating the coupling 22 in the counterclockwise direction D2. Therefore, the toner T can be supplied from the toner accommodation chamber 11B to the developing chamber 11A with required timing only by the operation of the coupling 22. Hence, no other component such as the lever in the known art is necessary. Accordingly, the size of the developing cartridge 10 can be reduced.

Furthermore, in the developing cartridge 10, in either case where the coupling 22 is rotated in the clockwise direction D1 or in the counterclockwise direction D2, the first gear 31 can be rotated counterclockwise and the developing roller 12 can be rotated in the same direction. Therefore, while development is performed, the toner T can be supplied from the toner accommodation chamber 11B to the developing chamber 11A.

Furthermore, the controller CU judges whether the remaining toner amount AT in the developing chamber 11A is smaller than or equal to the first predetermined value ATth1. If the controller CU judges that the remaining toner amount AT is smaller than or equal to the first predetermined value ATth1, the controller CU executes the transmitting step in which the command for causing the coupler 7 to take the second state is transmitted to the motor 8. Thus, the toner T can be supplied to the developing chamber 11A.

Furthermore, if the controller CU judges in the first judging step that the remaining toner amount AT is not smaller than or equal to the first predetermined value ATth1, the controller CU transmits in the transmitting step the command for causing the coupler 7 to take the first state to the motor 8. Thus, a state where the toner T is not supplied to the developing chamber 11A can be established.

Furthermore, if the controller CU receives in the receiving step a printing command for image formation of a plurality of pages and judges in the first judging step that the remaining toner amount AT is smaller than or equal to the first predetermined value ATth1, the controller CU transmits in the transmitting step the command for causing the coupler 7 to take the second state to the motor 8 when a predetermined page is to be printed, and transmits the command for causing the coupler 7 to take the first state to the motor 8 when pages subsequent to the predetermined page are to be printed. Thus, if the remaining toner amount AT is smaller than or equal to the first predetermined value ATth1, a large amount of toner can be supplied while the predetermined page is printed.

Furthermore, the controller CU executes the second judging step as well in which the controller CU judges whether the remaining toner amount AT is smaller than or equal to the second predetermined value ATth2. If the controller CU judges in the second judging step that the remaining toner amount AT is smaller than or equal to the second predetermined value ATth2, the controller CU transmits in the transmitting step the command for causing the coupler 7 to take the second state to the motor 8. Thus, if the remaining toner amount AT is smaller than or equal to the second predetermined value ATth2, a large amount of toner can be supplied while the predetermined page is printed.

While an embodiment of the present disclosure has been described above, the present disclosure is not limited to the above embodiment. Any specific configuration can be changed appropriately without departing from the scope of the present claims.

Figure 19:
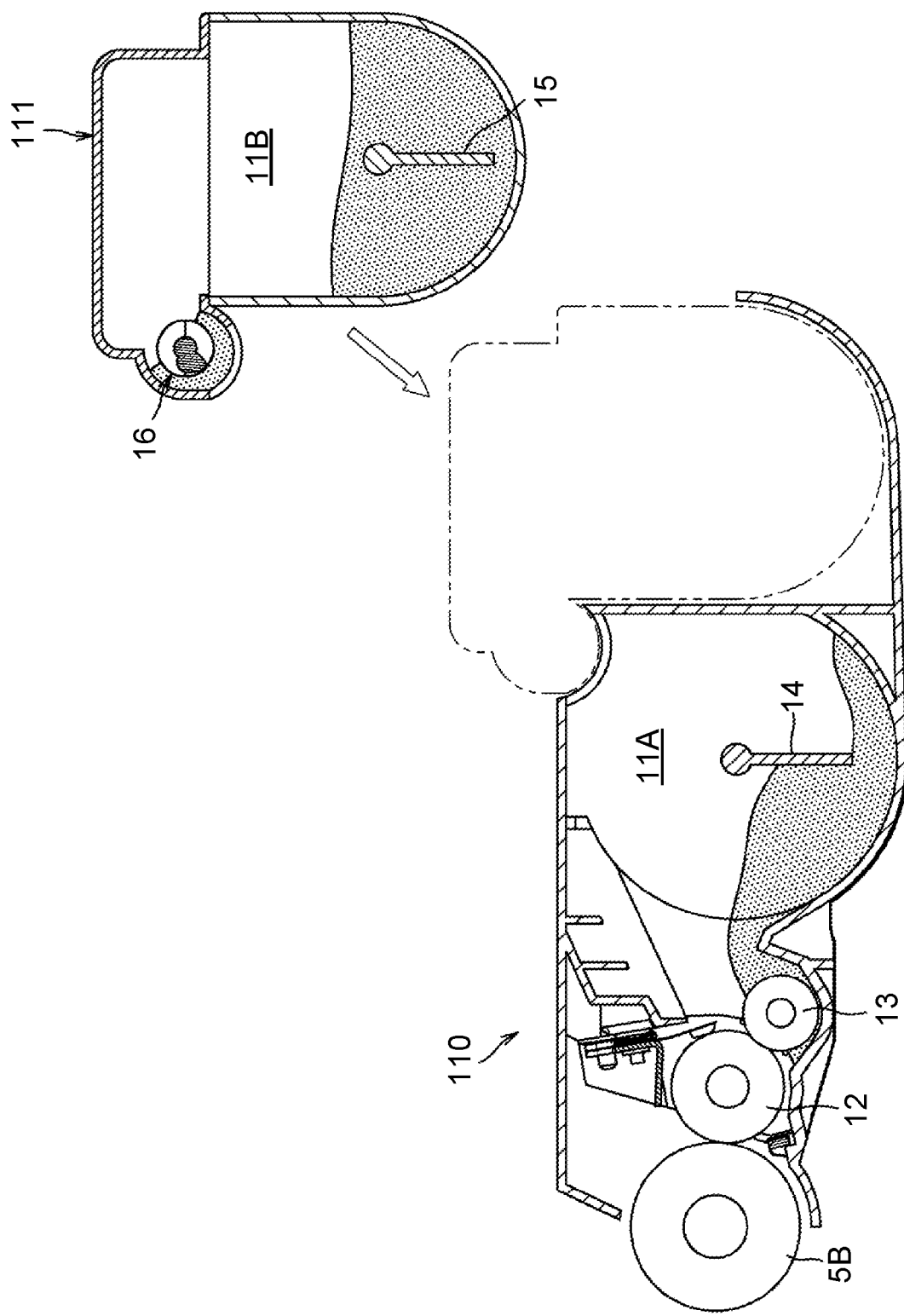
FIG. 19 is a diagram illustrating a developing device according to a modification.

The developing cartridge 10 is attachable to and detachable from the drum cartridge 5 in the above embodiment but is not limited thereto. As illustrated in FIG. 19, a developing device 110 may include the photosensitive drum 5B. That is, the developing device 110 may include the drum cartridge. In that case, a toner cartridge 111 having the toner accommodation chamber 11B may be provided separately from the developing device 110, and the toner cartridge 111 may be attachable to and detachable from the developing device 110.

Moreover, in the developing cartridge 10 according to the above embodiment, a portion forming the toner accommodation chamber 11B may be provided separately from a portion forming the developing chamber 11A, and the portion forming the toner accommodation chamber 11B may be configured to be attachable to and detachable from the portion forming the developing chamber 11A. That is, there may be provided three separate bodies of a drum cartridge, a developing cartridge, and a toner accommodation chamber.

The moving gear 33, which includes the small-diameter gear 33A and the large-diameter gear 33B having different sizes in the above embodiment, may include only a single gear. In that case, it is only necessary that the single gear is in mesh with the coupling gear 22B and is also allowed to be in mesh with the first gear 31.

The second gear 32 that includes the plurality of first projections P1 in the above embodiment and the clutch 40 that includes the plurality of second projections P2 in the above embodiment are not limited thereto. For example, the second gear 32 may include a single first projection. Furthermore, the clutch 40 may include a single second projection. Moreover, the first projections P1 each having the rotation transmitting surface F S1 and the inclined surface FS2 are not limited thereto. For example, one projection may have the rotation transmitting surface, and another projection that is different from the one projection may have the inclined surface. Likewise, one projection may have the first clutch surface, and another projection that is different from the one projection may have the second clutch surface.

The inclined surface FS2 and the second clutch surface FC2 both forming inclined surfaces that are inclined with respect to the direction of rotation in the above embodiment are not limited thereto. Only one of the inclined surface and the second clutch surface may form an inclined surface.

The coupling 22 having two surfaces (FP1) for moving the clutch 40 toward the disengaged position in the above embodiment is not limited thereto. The number of surfaces for moving the clutch 40 toward the disengaged position may be one or three or more.

The first coupling surface FP1 and the third clutch surface FC3 both forming inclined surfaces that are inclined with respect to the direction of rotation in the above embodiment is not limited thereto. Only one of the first coupling surface and the third clutch surface may form an inclined surface.

The developing cartridge 10 that is provided separately from the drum cartridge 5 in the above embodiment may be integrated with the drum cartridge.

The member that transports toner from the toner accommodation chamber 11B to the developing chamber 11A is the auger 16 in the above embodiment but is not limited thereto. The member may be an agitator. In that case, the transporting gear can be made rotatable together with the agitator.

In the above embodiment, the controller CU executes the second judging step if the controller CU judges in the first judging step that the remaining toner amount AT is smaller than or equal to the first predetermined value ATth1. Alternatively, the controller CU may execute the first judging step after the second judging step. For example, after the controller CU judges in the second judging step that the remaining toner amount AT is not smaller than or equal to the second predetermined value ATth2, the controller CU may judge in the first judging step whether the remaining toner amount AT is smaller than or equal to the first predetermined value ATth1.

In the above embodiment, the controller CU acquires the remaining toner amount AT through the sensor 9. Alternatively, the controller may acquire the remaining toner amount by counting the number of dots used in the image formation. For example, the controller CU may acquire the remaining toner amount by counting the number of dots used in the image formation as the remaining toner amount to be judged in either of the first judging step and the second judging step, or by counting the number of dots used in the image formation in both steps.

In the above embodiment, the image forming apparatus 1 that is monochrome has been described as an example of the image forming apparatus. Alternatively, the image forming apparatus may be a color image forming apparatus, an apparatus configured to perform exposure with LEDs, or a copying machine or a multifunction machine.

The elements according to the above embodiment and modifications thereof can be embodied by being combined in any way.

What is claimed is:

1. A developing device comprising:
a developing roller that is rotatable about a first axis extending in an axial direction;
a first gear for rotating the developing roller;
a second gear that is in mesh with the first gear and is rotatable in a first direction about a second axis extending in the axial direction;
a coupling that is rotatable about the second axis and is rotatable both in the first direction and in a second direction opposite to the first direction, the coupling including a coupling gear; and
a moving gear that is in mesh with the coupling gear and is rotatable both in the first direction and the second direction about a third axis extending in the axial direction, the moving gear being movable while being in mesh with the coupling gear between a first position where the moving gear is out of mesh with the first gear and a second position where the moving gear is in mesh with the first gear, the moving gear moving to the first position when the coupling gear rotates in the first direction and to the second position when the coupling gear rotates in the second direction,
wherein when the coupling gear rotates in the first direction,
the moving gear moves to the first position and goes out of mesh with the first gear, and
the first direction rotation of the coupling gear causes the second gear to rotate in the first direction together with the coupling gear and causes the first gear being in mesh with the second gear to rotate in the second direction; and
wherein when the coupling gear rotates in the second direction,
the moving gear moves to the second position and comes into mesh with the first gear, and
the second direction rotation of the coupling gear causes the moving gear, being in mesh with the coupling gear, to rotate in the first direction and to cause the first gear, being in mesh with the moving gear, to rotate in the second direction.

2. The developing device according to claim 1, comprising a casing that is capable of accommodating toner, the casing having a developing chamber that is capable of accommodating the toner.

3. The developing device according to claim 2, further comprising:
a photosensitive drum; and
a toner accommodation chamber that is separate from the developing chamber,
wherein the toner accommodation chamber is attachable to and detachable from the developing device.

4. The developing device according to claim 3, wherein the developing device includes a drum cartridge.

5. A developing device comprising:
a developing roller that is rotatable about a first axis extending in an axial direction;
a first gear for rotating the developing roller;
a casing that is capable of accommodating toner;
a coupling that is rotatable both in a first direction and in a second direction opposite to the first direction about a second axis extending in the axial direction and includes a coupling gear;
an auger or an agitator that is rotatable about an auger axis extending in the axial direction;
a transporting gear that is rotatable together with the auger or the agitator; and
a moving gear that is in mesh with the coupling gear and is rotatable both in the first direction and the second direction about a third axis extending in the axial direction, the moving gear being movable while being in mesh with the coupling gear between a first position where the moving gear is in mesh with the transporting gear and a second position where the moving gear is out of mesh with the transporting gear, the moving gear moving to the first position when the coupling gear rotates in the first direction and to the second position when the coupling gear rotates in the second direction,
wherein the first gear rotates the developing roller in the second direction based on rotation of the coupling gear in either the first or the second direction.

6. The developing device according to claim 5, comprising:
a second gear that is in mesh with the first gear and is rotatable in the first direction about the second axis; and wherein when the coupling gear rotates in the first direction,
the moving gear moves to the first position and goes out of mesh with the first gear, and
the first direction rotation of the coupling gear causes the second gear to rotate in the first direction together with the coupling gear and to cause the first gear, being in mesh with the second gear, to rotate in the second direction; and
wherein when the coupling gear rotates in the second direction,
the moving gear moves to the second position and comes into mesh with the first gear, and
the second direction rotation of the coupling gear causes the moving gear being in mesh with the coupling gear to rotate in the first direction and to cause the first gear, being in mesh with the moving gear, to rotate in the second direction.

7. The developing device according to claim 6,
wherein the moving gear includes a large-diameter gear and a small-diameter gear that rotate together, the large-diameter gear being in mesh with the first gear, the small-diameter gear being in mesh with the coupling gear; and
wherein the second gear has a larger diameter than the coupling gear.

8. The developing device according to claim 6, wherein when the coupling gear rotates in the second direction, the second direction rotation of the first gear causes the second gear, being in mesh with the first gear, to rotate in the first direction.

9. The developing device according to claim 5, further comprising:
a photosensitive drum,
wherein a toner accommodation chamber is attachable to and detachable from the developing device.

10. The developing device according to claim 9, wherein the developing device includes a drum cartridge.

11. The developing device according to claim 6, further comprising:
a first idle gear that is in mesh with the first gear;
a second idle gear that is in mesh with the first idle gear; and
a developing roller gear positioned at an end portion of the developing roller and that rotates together with the developing roller, the developing roller gear being in mesh with the second idle gear.

12. The developing device according to claim 11, further comprising:
a supply roller that supplies toner to the developing roller; and
a supply roller gear positioned at an end portion of the supply roller and that rotates together with the supply roller, the supply roller gear being in mesh with the second idle gear.

13. The developing device according to claim 12,
wherein the supply roller includes a supply roller shaft extending in the axial direction, and
wherein the supply roller gear is attached to an end portion of the supply roller shaft and is rotatable together with the supply roller shaft.

14. The developing device according to claim 11,
wherein the developing roller includes a developing roller shaft extending in the axial direction, and
wherein the developing roller gear is attached to an end portion of the developing roller shaft and is rotatable together with the developing roller shaft.

15. The developing device according to claim 5, wherein the developing device is a developing cartridge.

16. The developing device according to claim 5, wherein the developing device is attachable to and detachable from a drum cartridge including a photosensitive drum.

17. The developing device according to claim 15, wherein a toner accommodation chamber that is separate from the developing chamber is attachable to and detachable from the developing device.

18. The developing device according to claim 5, wherein the coupling is rotatable about the second axis when receiving a driving force, the coupling being rotatable both in the second direction and the first direction.

19. The developing device according to claim 18, wherein the coupling includes a recessed portion for receiving the driving force, the recessed portion being recessed in the axial direction.

20. The developing device according to claim 1,
wherein the moving gear includes a large-diameter gear and a small-diameter gear that rotate together, the large-diameter gear being in mesh with the first gear, the small-diameter gear being in mesh with the coupling gear; and
wherein the second gear has a larger diameter than the coupling gear.

21. The developing device according to claim 1, wherein when the coupling gear rotates in the second direction, the second direction rotation of the first gear causes the second gear, being in mesh with the first gear, to rotate in the first direction.

22. The developing device according to claim 1, further comprising:
a first idle gear that is in mesh with the first gear;
a second idle gear that is in mesh with the first idle gear; and
a developing roller gear positioned at an end portion of the developing roller and that rotates together with the developing roller, the developing roller gear being in mesh with the second idle gear.

23. The developing device according to claim 1, wherein the developing device is a developing cartridge.

24. The developing device according to claim 1, wherein the developing device is attachable to and detachable from a drum cartridge including a photosensitive drum.

25. The developing device according to claim 1, wherein the coupling is rotatable about the second axis when receiving a driving force, the coupling being rotatable both in the second direction and the first direction.

* * * * *